United States Patent

Diekelman et al.

[11] Patent Number: 5,555,444
[45] Date of Patent: Sep. 10, 1996

[54] METHOD AND APPARATUS FOR PREDICTIVE OPERATION OF A COMMUNICATION SYSTEM

[75] Inventors: Dennis P. Diekelman, Tempe; Catherine B. Stockwell, Phoenix, both of Ariz.

[73] Assignee: Motorola, Inc., Schaumburg, Ill.

[21] Appl. No.: 208,772

[22] Filed: Mar. 11, 1994

[51] Int. Cl.⁶ ................................................. H04B 7/185
[52] U.S. Cl. ........................ 455/12.1; 455/54.1; 455/56.1
[58] Field of Search ............................ 455/12.1, 13.1, 455/33.1, 33.2, 33.3, 54.1, 54.2, 561, 62, 33.4, 34.1; 370/54

[56] References Cited

U.S. PATENT DOCUMENTS

| | | | |
|---|---|---|---|
| 4,979,118 | 12/1990 | Kheradpir | 364/436 |
| 5,042,027 | 8/1991 | Takase et al. | 370/54 |
| 5,134,709 | 7/1992 | Bi et al. | 455/33.1 |
| 5,212,804 | 5/1993 | Choate | 455/56.1 |
| 5,268,694 | 12/1993 | Jan et al. | 455/33.1 |
| 5,327,572 | 7/1994 | Freeburg | 455/33.1 |

*Primary Examiner*—Reinhard J. Eisenzopf
*Assistant Examiner*—Thanh Le
*Attorney, Agent, or Firm*—Sherry J. Whitney; Walter W. Nielsen

[57] ABSTRACT

A method and apparatus for controlling operations of a cellular communication system having multiple satellites, multiple subscriber units which communicate through the multiple satellites, and a system control segment which creates a subscriber traffic prediction and manages operation of the communication system. The method includes the steps of decomposing a traffic prediction request into regional traffic requests; determining a regional traffic prediction for each regional traffic request based on past regional traffic history; and combining the regional traffic requests into a consolidated subscriber traffic prediction. The subscriber traffic prediction is then used to determine a system operational plan which controls operations of the communication system.

30 Claims, 11 Drawing Sheets

METHOD AND APPARATUS FOR PREDICTIVE OPERATION OF A COMMUNICATION SYSTEM

CROSS-REFERENCE TO RELATED INVENTIONS

This application is related to co-pending U.S. patent application Ser. No. 08/089,464, filed on Jul. 12, 1993, entitled "Improved Communication Method, and Apparatus", and 08/150,702, filed on Nov. 10, 1993, entitled "Satellite Cellular Network Resource Management Method, and Apparatus", both of which are assigned to the same assignee as the present application.

FIELD OF THE INVENTION

The present invention relates generally to a global cellular communication system and, more particularly, managing such a communication system to accommodate communication traffic demand.

BACKGROUND OF THE INVENTION

As defined herein, a "Subscriber" is a communication system user. "Subscriber traffic" is defined herein as data originating from one or more communication devices operated by one or more Subscribers. The Subscriber traffic-carrying capacity of a communications system is limited, because a finite quantity of resources (e.g., electrical energy stored in a satellite battery, or channel capacity of a radio link) exists within any communication system. Correspondingly, the number of Subscribers who may access the communication system at one time is also limited. When Subscriber traffic exceeds the capacity of the communication system, some Subscribers will be denied access. Frequent denial of access is likely to result in unsatisfied Subscribers.

In any system with finite resources, management of the system resources is desirable to provide better system performance (e.g., more Subscriber traffic-carrying capacity) than if resource management were not performed at all.

Prior art ground-based (non-cellular) communication systems (e.g., a telephone network) generally contain communication nodes (e.g., telephones or radios) utilized by Subscribers, a central control facility which manages overall operation of the system, and routing devices which route Subscriber traffic based on instructions from the central control facility. One function of the central control facility may be to control Subscriber traffic routing through the system. Prior art routing management may be done in a reactive manner (i.e., the control facility adjusts routing instructions in real-time by reacting to actual quantities of Subscriber traffic), or it may be done in a predictive manner (i.e., the control facility predicts future quantities of Subscriber traffic, and instructs routing devices to route future Subscriber traffic based on the prediction).

Prior art ground-based cellular communication systems also contain communication nodes (e.g., cellular telephones), routing devices, and a central control facility. However, central control facilities for prior art ground-based cellular communications systems do not manage Subscriber traffic routing in a predictive manner. They merely react to Subscriber traffic demand in real-time. When Subscriber traffic demand exceeds the capacity of the system, users will be denied access to the system.

Non-cellular and cellular routing devices typically have a fixed set of communication nodes to service. Non-cellular routing devices service communication nodes that are generally coupled to the specific routing device through some static transmission medium. Cellular routing devices service communication nodes that are located within a fixed geographical area within communication range of the particular routing device.

As communication needs grow, satellite cellular communication systems have become a desirable alternative to prior art ground-based non-cellular and cellular communication systems. Unlike prior art ground-based systems, satellite communication systems may readily provide world-wide communication coverage. Routing devices associated with satellite cellular communication systems (i.e., satellites) differ from routing devices of ground-based communication systems in two ways.

First, satellites may not service a fixed quantity of Subscribers. For non-geostationary satellites, the satellites move with respect to the surface of the earth. Thus, the geographical area, and the number of Subscribers seen by a satellite may vary dramatically with the changing location of the satellite.

Second, the resources of satellite cellular routing devices are highly dynamic. Weight and size constraints limit the quantity of resources each satellite may contain at launch. Additionally, resources are difficult to increase or replenish due to the remoteness of the satellites. For example, electrical energy replenishment may be accomplished by conversion of solar energy. This results in a cyclic state of charge of the satellite batteries because the satellite is only in a position to absorb solar energy when it is in view of the sun, or in twilight. When the earth is positioned between the satellite and the sun, the satellite cannot absorb solar energy. Because electrical energy is drained from the batteries as the satellite supplies on-board equipment and supports subscriber traffic, and electrical energy is replenished by the sun, the energy availability for the satellites is dynamic.

Accordingly, each satellite may have a completely different set of rules, and constraints from every other satellite, and the overall state of the system may never repeat. Ground-based routing devices, on the other hand, generally enjoy a continuous supply of energy, or energy is more easily replenished.

In a satellite communication system, resource management is critical because of the dynamic Subscriber traffic and the dynamic resource availability. Without resource management, for example, the electrical energy stored on board a satellite may rapidly be exhausted after the satellite passes into the shadow of the earth, and begins servicing Subscribers within a major metropolitan area. Service would then be denied to later Subscribers within the satellite's path until the satellite recharged its batteries. For example, a communication system should not allow Subscriber traffic from a busy metropolitan area (e.g., Tokyo, Japan) to consume all the stored energy on board a satellite that may be needed, say, ten minutes later to support another busy metropolitan area (e.g., Sydney, Australia).

Adequate resource management depends on an accurate prediction of Subscriber traffic which the satellite will encounter. Such a prediction would allow the communication system to knowledgeably limit Subscriber access over a particular metropolitan area while still providing acceptable service to the metropolitan area and other geographical areas over which the satellite subsequently passes.

What is needed is a method for predicting Subscriber traffic demand for a cellular communication system so that the resource use may be controlled in a manner which allows the system to handle Subscriber traffic efficiently. Particularly needed is a method for predicting Subscriber traffic demand for a satellite cellular communication system containing limited, dynamic resources, where Subscriber traffic demand varies.

SUMMARY OF THE INVENTION

The advantages of the present invention are carried out in one form by an improved method for predictively controlling operations of a communication system comprising a system control segment, and one or more routing devices. The method comprises the steps of: creating, by the system control segment, a subscriber traffic prediction; generating, by the system control segment, a system operational plan based on the subscriber traffic prediction; and executing the system operational plan, by the one or more routing devices, by conforming operations to the system operational plan.

The advantages of the present invention are carried out in another form by an improved apparatus for a cellular communication system comprising a system control segment, which creates a subscriber traffic prediction based on call data records, and which also creates a system operational plan based on the subscriber traffic prediction, and which also creates individual plans based on the system operational plan. The cellular communication system additionally comprises one or more satellites, which receive the individual plans from the system control segment, and conform operations to the individual plans, and broadcast access information contained within the individual plans. The cellular communication system additionally comprises multiple subscriber units, which contain resident memory devices having access numbers which allow a particular subscriber unit to determine whether the particular subscriber unit may access the cellular communication system based on the access information broadcast by the one or more satellites.

The advantages of the present invention are carried out in another form by an improved apparatus for a satellite communication subsystem for use in a cellular communication system comprising multiple satellites, at least some of which are moving with respect to a surface of a celestial body, each of the multiple satellites containing communication resources including one or more transmitters, and receivers for providing communication with at least one subscriber unit, and having at least two devices for receiving, and transmitting electromagnetic energy coupled to the one or more transmitters, and receivers. The subsystem comprises satellite resident memory containing an individual operational plan provided to the multiple satellites by a system control segment, the individual operational plan for operating the multiple satellites for a future time set, the individual operational plan being based on a subscriber traffic prediction, and causing the multiple satellites to change a satellite's mode of operation at predetermined times during the future time set. The subsystem additionally comprises a satellite resident controller coupled to the satellite resident memory, and the one or more transmitters, and receivers. The satellite resident controller is for actuating the one or more transmitters, and receivers in accordance with communication traffic passing through the multiple satellites in a manner determined by the individual operational plan stored in the satellite resident memory.

The advantages of the present invention are carried out in another form by an improved circuit for use by a subscriber unit in a communication system comprising a system control segment, and one or more routing devices which provide communication channels. The circuit interfaces said subscriber unit with the communication system and comprises means for transmitting identification information to the system control segment where the identification information is used to generate a system operational plan which includes one or more allowable access numbers. The circuit additionally comprises means for attempting to utilize one of the communication channels when the one or more routing devices broadcast the one or more allowable access numbers and one of the one or more allowable access numbers is compatible with a particular access number contained within a resident memory device of the particular subscriber unit.

BRIEF DESCRIPTION OF THE DRAWING

The invention is pointed out with particularity in the appended claims. However, a more complete understanding of the present invention may be derived by referring to the detailed description, and claims when considered in connection with the figures, wherein:

Figure 1:
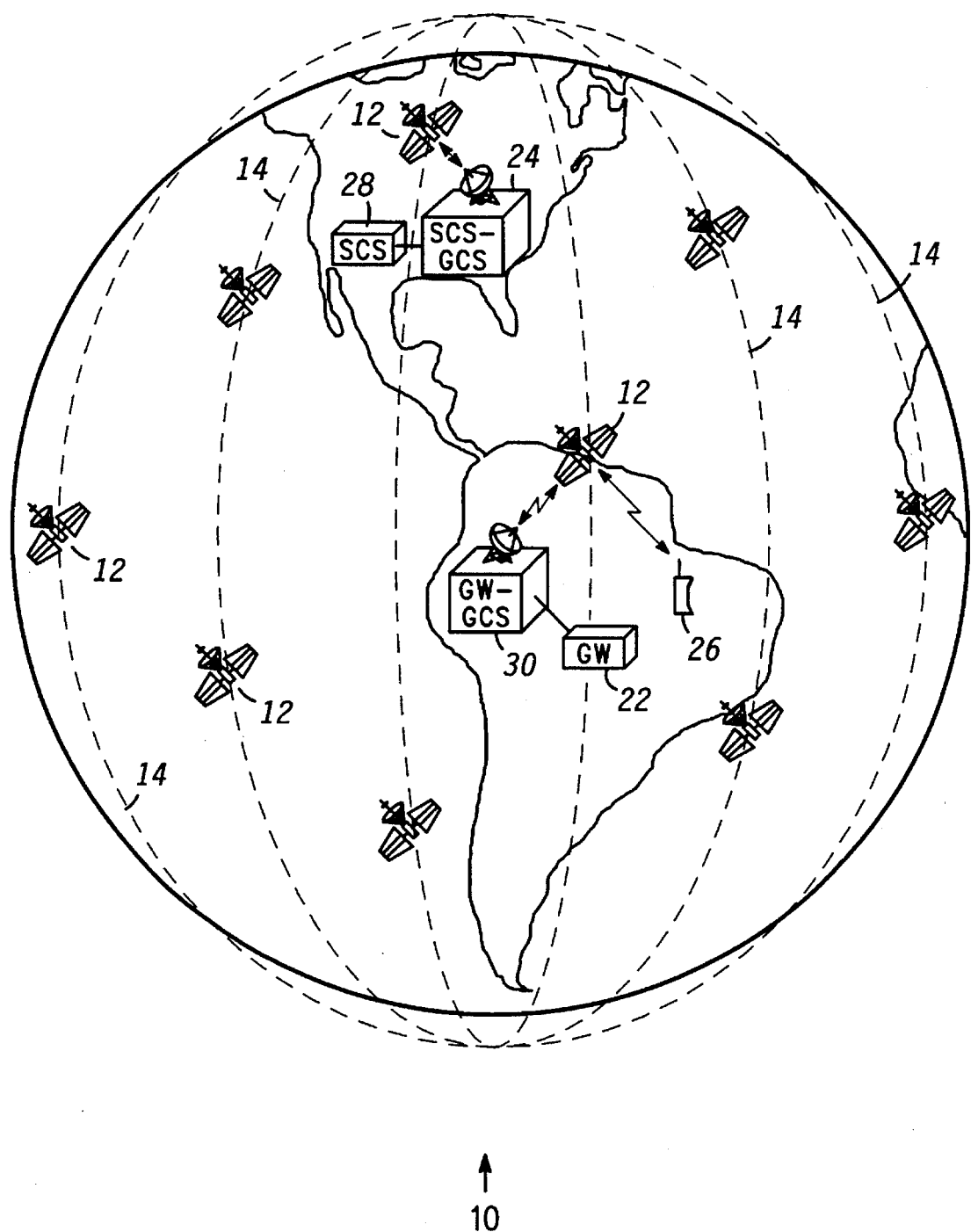
FIG. 1 illustrates a satellite-based cellular communication system in conceptual form in accordance with the present invention.

The exemplification set out herein illustrates a preferred embodiment of the invention in one form thereof, and such exemplification is not intended to be construed as limiting in any manner.

GLOSSARY OF TERMS

"Call Attempt Count"—a number of call attempts made from a particular region during a Time Span.

"Call Data Record" (CDR)—a record of a call setup, and completion.

"Candidate Model"—a Traffic Model that has been identified as relevant to a Regional Traffic Request.

"CDR"—see "Call Data Record".

"Gateway" (GW)—an equipment facility, typically ground-based, which is capable of interfacing a Gateway Ground Communication Station (GW-GCS) (and thus satellites) with ground-based equipment such as, for example, a public switched telephone network (PSTN).

"GCS"—see "Ground Communication Station".

"Ground Communication Station" (GCS)—a terrestrial communication facility capable of interfacing ground-based equipment (e.g., a Gateway or System Control Segment) with one or more satellites.

"GW"—see "Gateway".

"GW-GCS"—a Ground Communication Station (GCS) associated with a Gateway (GW).

"RC"—see "Region Code".

"Regional Traffic Request"—a low-level request for a Regional Traffic Prediction over a Time Span for a contiguous geographic region. Usually, a portion of a decomposed Traffic Prediction Request.

"Regional Traffic Prediction"—a statistical prediction of the expected traffic demand corresponding to a specific Regional Traffic Request.

"Region Code" (RC)—a value (e.g., a number or letter) which uniquely identifies a particular region.

"SCS"—see "System Control Segment".

"SCS-GCS"—a Ground Communication Station (GCS) associated with a System Control Segment (SCS).

"SU"—see "Subscriber Unit".

"Subscriber"—a communication system user.

"Subscriber Traffic Prediction"—a statistical prediction of the expected traffic demand corresponding to a specific Traffic Prediction Request. Usually, a composite of Regional Traffic Predictions.

"Subscriber Unit" (SU)—an individual communication terminal which communicates directly with a satellite via a radio link.

"System Control Segment" (SCS)—a control facility, typically ground-based, which controls operation of a communication system.

"System Node"—a satellite, GW, SCS, SCS-GCS, GW-GCS, or other device which interfaces with the communication system.

"System Operational Plan"—a master system plan which specifies how system resources should be used during a specified Time Set.

"Time Set"—any combination of Time Spans.

"Time Span"—a bounded, contiguous period of time.

"Traffic Model"—a statistical description of Subscriber traffic.

"Traffic Prediction Request"—a high-level request for a Subscriber Traffic Prediction.

"Validity Flag"—information identifying a set of data. Validity Flags desirably describe what Time Spans, regions, and traffic types the data set corresponds to.

DETAILED DESCRIPTION OF PREFERRED EMBODIMENTS

For successful operation of a communication system, management of each System Node's finite resources is necessary to maximize system efficiency. Management of system resources depends on accurate Subscriber Traffic Predictions throughout the system.

An accurate Subscriber Traffic Prediction enables the system resources manager to apply resources in accordance with the system manager's desires (e.g., to critical regions). Accordingly, areas anticipated to have high demand will desirably be allocated more resources than low-demand areas. If a Subscriber Traffic Prediction is inaccurately high (e.g., a predicted high-demand area actually experiences low demand), then the excess resources allocated to this area will be under-utilized. Of more immediate concern, if a predicted low-demand area actually experiences high demand, Subscribers may be denied access to the system. The present invention comprises, in corresponding preferred embodiments, an improved method of operating the communication system by creating a Subscriber Traffic Prediction, and an apparatus for implementing the method.

A. Preferred Apparatus

FIG. 1 illustrates a satellite-based cellular communication system 10 in schematic form in accordance with the present invention. Communications system 10 is dispersed over, and surrounding the earth through the use of orbiting satellites 12. Communication system 10 is not limited to operating around the earth, as it may be operated around any celestial body.

Satellites 12 occupy orbits 14 that may be low-earth orbits, medium-earth orbits, geosynchronous orbits, or a combination thereof. Low-earth orbits occur generally at an altitude of approximately 600 km to 2000 km, medium-earth orbits occur at approximately 2000 km to 20,000 km, and geosynchronous orbits occur at approximately 42,165 km, but other altitudes may also be used. In the example shown, communications system 10 uses six polar orbit planes, with each orbit plane holding eleven satellites 12 for a total of sixty-six satellites 12. However, sixty-six satellites 12 are not essential, and more or fewer satellites 12, or more or fewer orbit planes, or combinations of orbiting, and geosynchronous satellites, may be used. For clarity, FIG. 1 illustrates only a few of satellites 12.

Satellites 12 operate as routing devices for communication system 10, and communicate with terrestrial equipment which may be any number of radiocommunication Subscriber Units 26, System Control Segment Ground Communication Stations 24 or Gateway Ground Communication Stations 30.

The Subscriber Unit 26 (SU) shown in FIG. 1 may be, for example, a hand-held, portable cellular telephone adapted to transmit Subscriber data to, and receive Subscriber data from satellites 12. A SU 26 may also be a facsimile device, pager, data terminal or any other type of communication device.

A "Ground Communication Station" (GCS) is a terrestrial communication facility capable of interfacing ground-based equipment (e.g., Gateway 22 or System Control Segment 28) with one or more satellites 12. FIG. 1 shows Gateway GCS 30 (GW-GCS) associated with Gateway 22, and System Control Segment GCS 24 (SCS-GCS) associated with System Control Segment 28. SCS-GCSs 24 desirably perform data transfer, and telemetry, tracking, and control functions for the constellation of satellites 12. GW-GCSs 30 desirably perform data transfer between satellites 12, and Gateways 22.

A "Gateway" 22 (GW) is an equipment facility, typically ground-based, which is capable of interfacing GW-GCS 30 (and thus satellites 12) with ground-based equipment such as, for example, a public switched telephone network (PSTN), not shown. GWs 22 desirably perform call processing functions in conjunction with SUs 26, terrestrial telephony equipment (TTE) (e.g., PSTN equipment), and satellites 12. GWs 22 communicate with the rest of communication system 10 via GW-GCSs 30. GWs 22 need not be co-located with GW-GCSs 30. GWs 22 are preferably coupled to GW-GCSs 30 via land-lines, although this is not essential. In an alternate embodiment, GWs 22 may be coupled to GW-GCSs 30 via fiber optic links, radio links or other transmission media.

A "System Control Segment" 28 (SCS) is a control facility, typically ground-based, which controls operation of communication system 10. SCS 28 communicates with the rest of communication system 10 via SCS-GCS 24. SCS 28 need not be co-located with SCS-GCS 24. SCS 28 is preferably coupled to SCS-GCS 24 via land-lines, although this is not essential. In an alternate embodiment, SCS 28 may be coupled to SCS-GCS 24 via fiber optic links, radio links or other transmission media.

As used herein, reference to a message sent to either a SCS 28 or a GW 22 refers to a message sent to those facilities through a SCS-GCS 24 or a GW-GCS 30, respectively.

Only one each of GW 22, SCS 28, SU 26, SCS-GCS 24, and GW-GCS 30 is shown in FIG. 1 for clarity, and ease of understanding. Those of skill in the art will understand based on the description herein that additional System Nodes may be desirable, depending upon the needs of the communication system.

Figure 2:
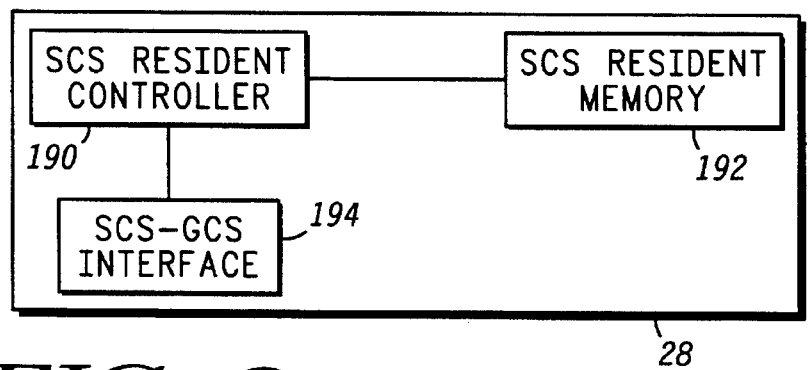
FIG. 2 shows a block diagram of a System Control Segment in accordance with the present invention.

FIG. 2 shows a block diagram of a SCS in accordance with the present invention. SCS 28 desirably includes SCS resident controller 190 coupled to SCS resident memory 192. SCS resident controller 190 is also coupled to SCS-GCS interface 194. In a preferred embodiment, SCS resident controller 190 generates a System Operational Plan which specifies resource usage by the System Nodes of communication system 10 (FIG. 1). The System Operational Plan is divided into each System Node's individual portion of the plan, and each individual portion is communicated to the System Nodes through SCS-GCS interface 194 which transmits the operational plan to SCS-GCS 24 (FIG. 1). SCS-GCS interface 194 also receives data from SCS-GCS 24.

Figure 3:
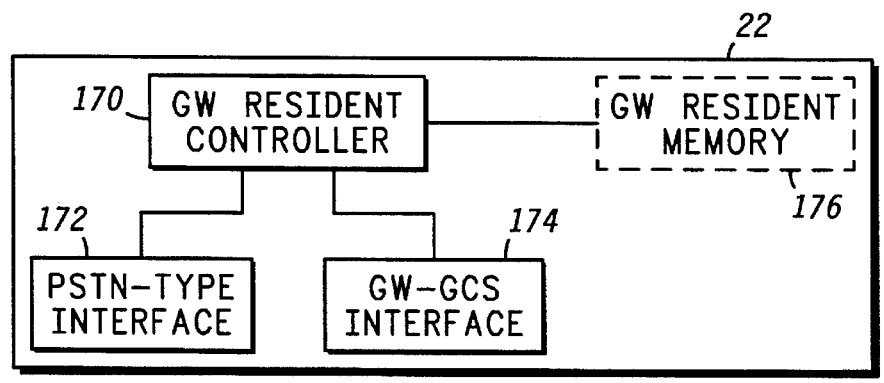
FIG. 3 shows a block diagram of a Gateway in accordance with the present invention.

FIG. 3 shows a block diagram of a GW in accordance with the present invention. GW 22 desirably includes GW resident controller 170 coupled to PSTN-type interface 172. PSTN-type interface 172 may connect GW 22 to a PSTN, an international switching center (ISC), or another network, based on the requirements of the particular communications system. GW resident controller 170 is also coupled to GW-GCS interface 174. GW 22 communicates with the rest of the system via GW-GCS interface 174. In an alternate embodiment, GW 22 may additionally include GW resident memory 176.

Figure 4:
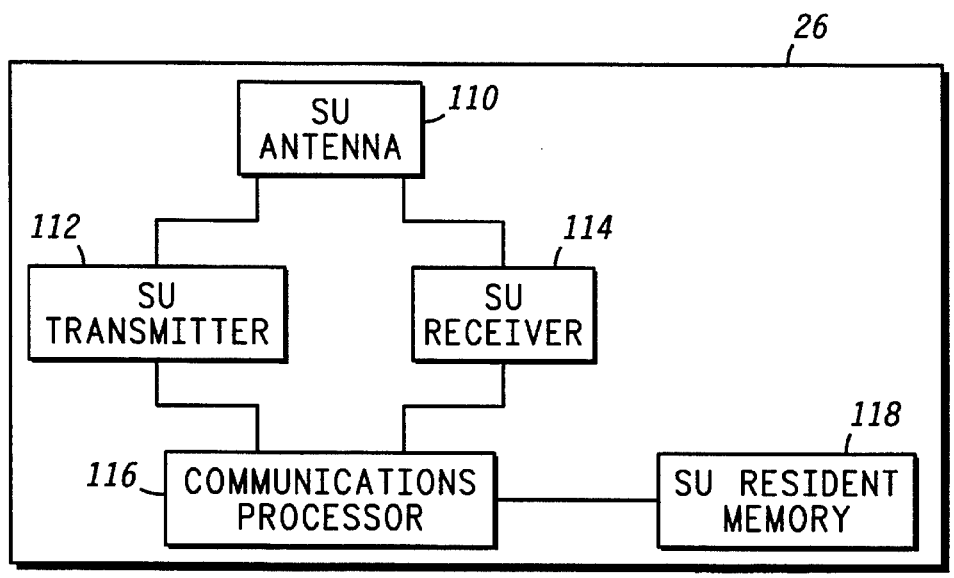
FIG. 4 shows a block diagram of a Subscriber Unit in accordance with the present invention.

FIG. 4 shows a block diagram of a SU in accordance with the present invention. SU 26 may be either a stationary or a mobile communications unit. SU 26 desirably includes SU antenna 110 coupled to SU transmitter 112, and SU receiver 114, which are in turn coupled to communications processor 116. SU 26 transmits, and receives Subscriber data, identification information, and system data through SU transmitter 112, and SU receiver 114, respectively. Identification information desirably includes the SU type (e.g., cellular telephone), traffic type (e.g., voice), data rate (e.g., 2400 bits per second), and a unique equipment identifier (e.g., a unique serial number of the SU 26). Some or all of the identification information is desirably transmitted to, and used by the SCS 28 to generate a Subscriber Traffic Prediction and a System Operational Plan.

Communications processor 116 is coupled to SU resident memory 118. Communications processor 116 controls, and manipulates data (e.g., voice data) communicated to, and from SU 26. Part of the communications processor's control task is to evaluate whether SU 26 may make a "call" on communication system 10 (FIG. 1), and, if SU 26 may make a call, what communication channels SU 26 may use. This evaluation depends on access, and channel information broadcast by a satellite 12 (FIG. 1) which is received by SU 26 through SU receiver 114.

In a preferred embodiment, SUs 26 transmit, and receive data in the form of data packets. A data packet is defined herein as a portion of a message desirably containing routing information (e.g., source, and destination addresses), and Subscriber data.

Figure 5:
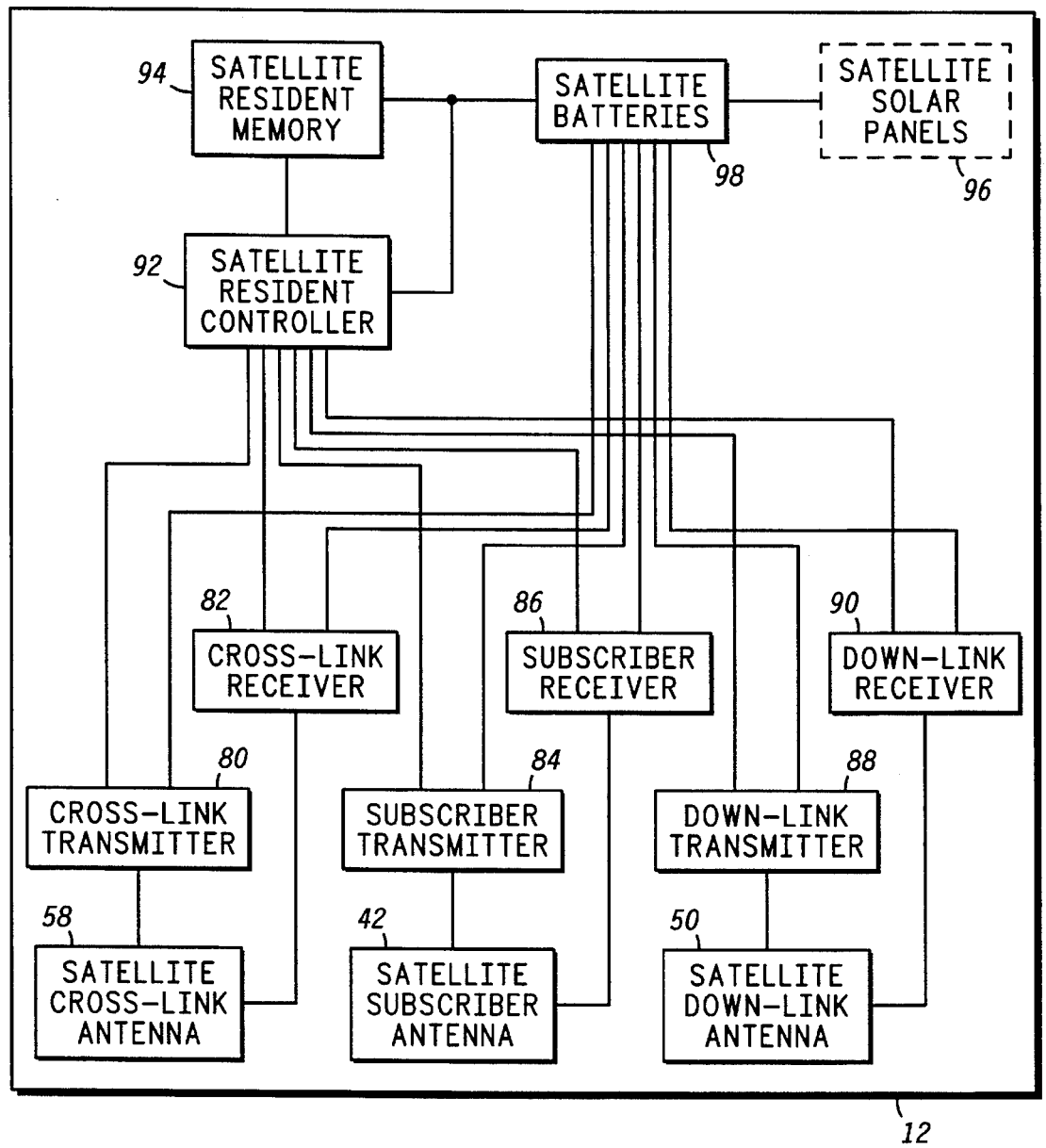
FIG. 5 shows a block diagram of a satellite in accordance with the present invention.

FIG. 5 shows a block diagram of a satellite 12 in accordance with the present invention. Satellite 12 desirably includes satellite cross-link antenna 58, satellite down-link antenna 50, and satellite Subscriber antenna 42. Although only one each of satellite cross-link antenna 58, satellite down-link antenna 50, and satellite Subscriber antenna 42 are shown in FIG. 5, more than one of each type of antenna may exist on board satellite 12, or one or more of the antennas may be combined.

Satellite cross-link antenna 58 is coupled to cross-link transmitter 80, and cross-link receiver 82. Satellite Subscriber antenna 42 is coupled to Subscriber transmitter 84, and Subscriber receiver 86. Satellite Subscriber antenna 42 projects a "cell pattern" toward the earth. A cell pattern contains one or more directional communication channels. Each channel desirably allows a SU 26 to communicate with a satellite 12.

Satellite down-link antenna 50 is coupled to down-link transmitter 88, and down-link receiver 90. Transmitters 80, 84, 88, and receivers 82, 86, 90 are coupled to satellite resident controller 92, which is coupled to satellite resident memory 94. A System Operational Plan is conveniently received from SCS 28 (FIG. 2) by satellite 12 through satellite down-link antenna 50, and down-link receiver 90, and is stored in satellite resident memory 94. The System Operational Plan includes access, and channel information which a satellite 12 broadcasts within its cell pattern, and which SUs 26 use to determine whether or not to attempt a call.

Satellite resident controller 92 controls real-time operation of satellite 12. This partially entails regulating Subscriber traffic in accordance with the System Operational Plan stored in satellite resident memory 94. Satellite resident controller 92 broadcasts access, and channel information to all SUs 26 within the satellite's cell pattern. This access, and channel information is contained within the System Operational Plan. The access, and channel information informs the SUs 26 whether or not to attempt to make a call.

Satellite resident controller 92 desirably monitors Subscriber traffic in real-time. Satellite resident controller 92 desirably counts how many call attempts were made by SUs 26 within the satellite's cell pattern, and stores the Call Attempt Count in satellite resident memory 94. The Call Attempt Count desirably includes all call attempts, whether or not they were successful.

Satellite resident controller 92 desirably transmits telemetry information through satellite down-link antenna 50 to SCS 28. The telemetry information desirably includes the Call Attempt Count. In a preferred embodiment, this information may be used by SCS 28 during generation of System Operational Plans.

Satellite 12 may also include satellite solar panels 96 coupled to satellite batteries 98. Satellite batteries 98 are coupled to, and provide electrical energy to satellite resident memory 94, satellite resident controller 92, transmitters 80, 84, 88, and receivers 82, 86, 90.

Those of skill in the art will understand based on the description herein that routing devices other than orbiting satellites (e.g., satellites 12) may be used to accomplish the same functions as satellites 12. For example, a routing device may be a stationary or mobile, ground-based cellular site.

Satellites 12 are conveyed as moving with respect to the surface of the earth. Those of skill in the art will understand based on the description herein that satellites in geosynchronous orbits may also serve as routing devices in a communication system.

B. Data Flow Through Communication System

Figure 6:
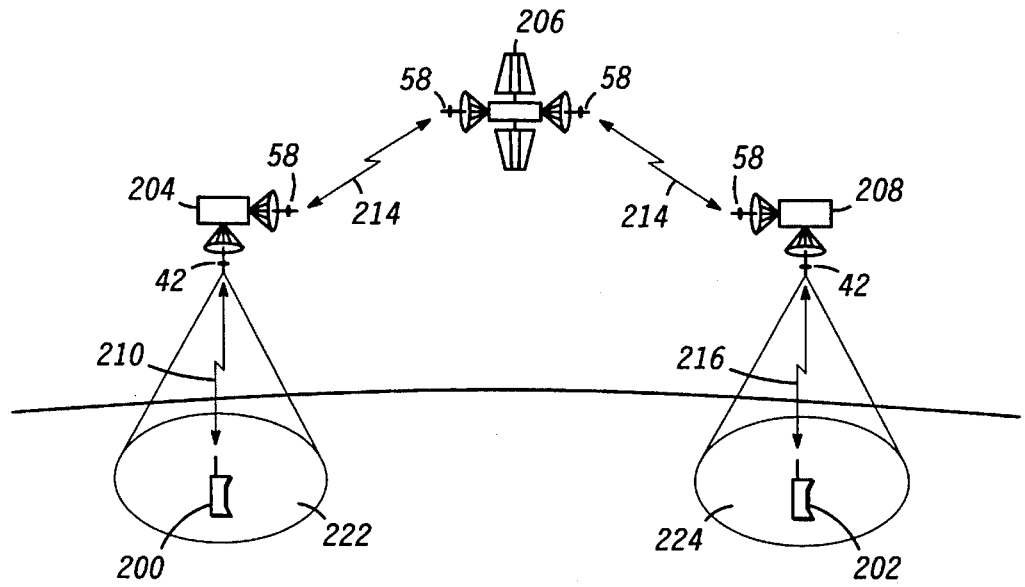
FIG. 6 shows a conceptual diagram of communication links between two Subscriber Units in accordance with the present invention.

FIG. 6 shows a conceptual diagram of communication links between two Subscriber Units (SUs 200, 202) in accordance with the present invention. Data packets originating from a "source SU" 200 are desirably routed through the system to a "destination SU" 202. Each data packet desirably includes the address of destination SU 202.

Over link 210, source SU 200 first transmits data packets intended for destination SU 202 to source satellite 204, in whose cell pattern 222 source SU 200 is located. Source satellite 204 receives the data packets via satellite Subscriber antenna 42. Source satellite 204 routes the data packets through intermediate satellite 206 to destination satellite 208 over cross-links 214. Cross-link traffic is transmitted, and received by satellites 204, 206, 208 via satellite cross-link antennas 58. Routing is performed according to a predetermined routing plan which is part of the System Operational Plan stored in the satellite resident memory 94 (FIG. 5) of satellites 204, 206, 208.

Destination satellite 208, which is the satellite in whose cell pattern 224 destination SU 202 is located, then transmits received data packets via satellite Subscriber antenna 42 to destination SU 202 over link 216.

The format of the data packets may differ between SU-to-satellite links 210, 216, and satellite-to-satellite links 214. For example, source satellite 204 may multiplex together data packets from multiple SUs (e.g., SU 200) within source satellite's cell pattern 222. The multiplexed data packets may then be routed through intermediate satellite 206. Intermediate satellite 206 may then demultiplex the data packets, and remultiplex them to be routed to different destination satellites (not shown in FIG. 6).

In a preferred embodiment, a satellite (e.g., satellite 204, 206, 208) may communicate directly with another satellite via satellite cross-link antenna 58. In an alternate embodiment, a satellite may transmit data to a relay facility (not shown in FIG. 6), usually ground-based. The relay facility may then route data via land lines, or transmit data to another satellite.

Figure 7:
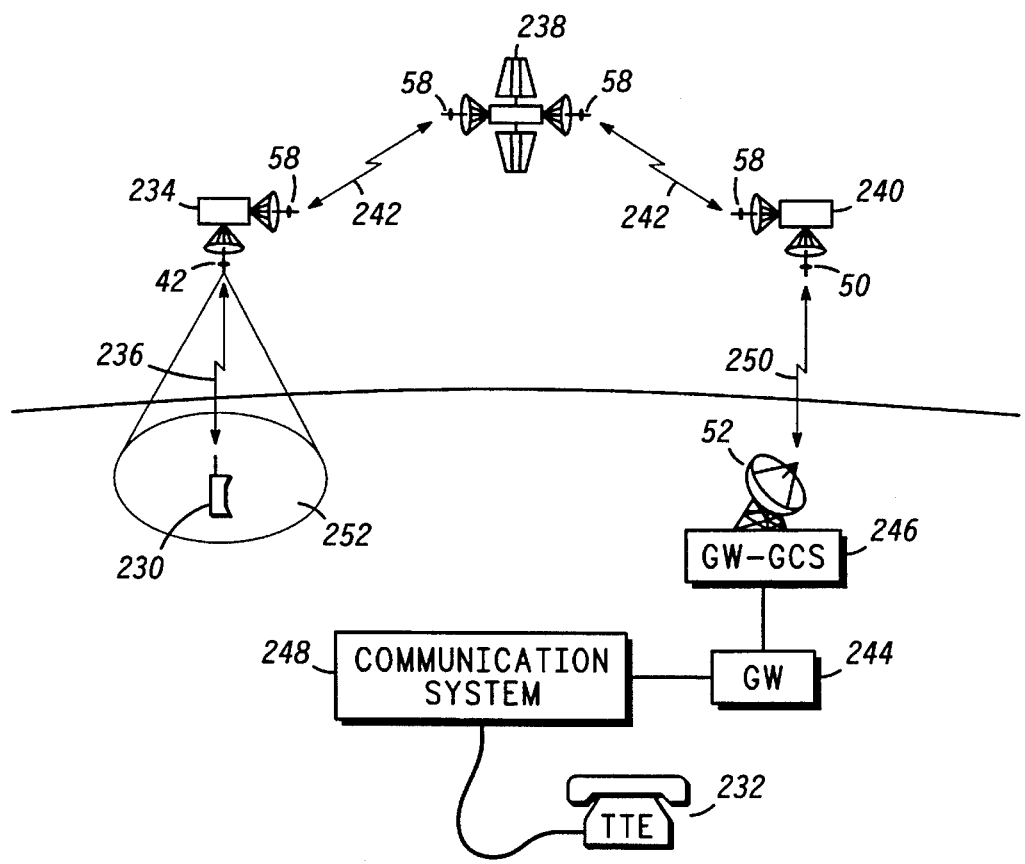
FIG. 7 shows a conceptual diagram of communication links between a Subscriber Unit, and terrestrial telephone equipment in accordance with the present invention.

FIG. 7 shows a conceptual diagram of communication links between a Subscriber Unit (source SU 230) and terrestrial telephone equipment (destination TTE 232) in accordance with the present invention. Over link 236, source SU 230 first transmits data packets intended for destination TTE 232 to source satellite 234, in whose cell pattern 252 source SU 230 is located. Source satellite 234 receives the data packets via satellite Subscriber antenna 42. Source satellite 234 then routes the data packets through intermediate satellite 238 to destination satellite 240 over cross-links 242. Data is transmitted over cross-links 242 via satellite cross-link antenna 58. Data routing is performed according to a predetermined routing plan which is part of the operational plan stored in the satellite resident memory 94 (FIG. 5) of satellites 234, 238, 240.

Destination satellite 240 then transmits the data packets to destination GW-GCS 246, and thus destination GW 244, over link 250. The communication link between destination satellite 240, and destination GW-GCS 246 is established via satellite down-link antenna 50, and GW-GCS antenna 52.

Destination GW 244 then routes data packets to destination TTE 232 through communication system 248 (e.g., a PSTN).

As would be understood by those of skill in the art based on the description herein, a similar routing strategy may be used for data communication between two TTEs which communicate through a satellite network.

The foregoing description designated a particular SU or TTE to be either a source or destination device. This designation is purely arbitrary. It will be understood by those of skill in the art based on the description herein that in a communication system which allows two-way communication between devices (i.e., devices both transmit, and receive data), each device may be both a source, and a destination device simultaneously.

C. Discussion of Preferred Method

1. Regions

Figure 8:
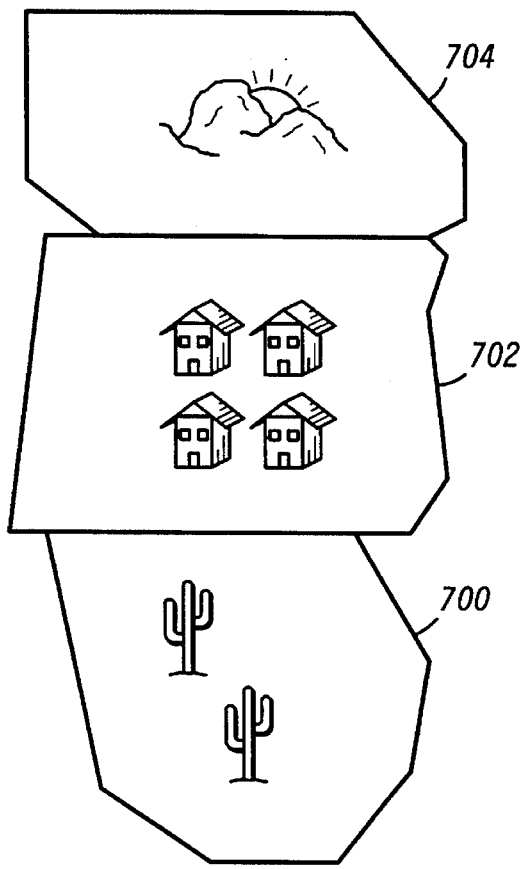
FIG. 8 shows an example of regions on a surface of the earth in accordance with the present invention.

FIG. 8 shows an example of regions on a surface of the earth in accordance with the present invention. For example, a portion of the surface of the earth that has been divided into regions 700, 702, 704 is shown. Desirably, the entire surface of the earth is divided into regions. Most commonly, a region is a contiguous area on the surface (i.e., land or sea) of the earth which is identified by known latitude, and longitude boundaries.

A Region Code (RC) is a value (e.g., a number or letter) which uniquely identifies a particular region. A unique RC is desirably associated with each region for identification purposes. RCs are used, for example, to indicate the approximate location of a particular SU or other communication device, or to identify a specific region for a Subscriber Traffic Prediction.

2. Creation of Call Data Records, and Update of Call Attempts Counts

Figure 9:
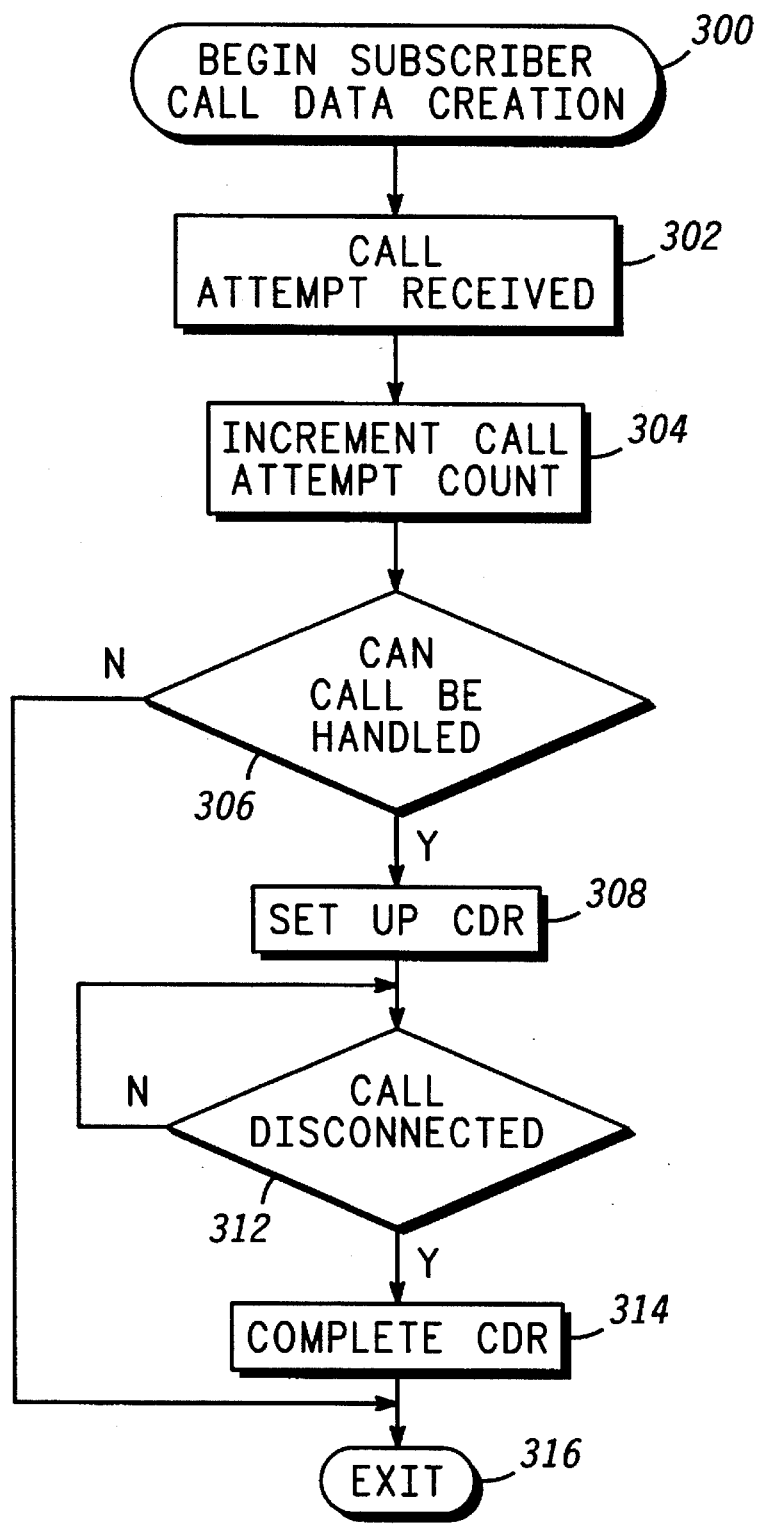
FIG. 9 illustrates a flow chart of a method for creating Subscriber Call Data Records in accordance with the present invention.

FIG. 9 illustrates a flow chart of a method for creating Subscriber call data in accordance with the present invention. Call Data Records (CDRs), and Call Attempt Counts are important Subscriber "call data" which SCS 28 (FIG. 1) desirably uses to make a Subscriber Traffic Prediction. A CDR is desirably a record of a call setup, and completion. The Call Attempt Count is desirably a tally of call attempts made from a particular region during a Time Span.

As defined herein, a "communication unit" is either a SU (e.g., SU 26, FIG. 1) or a TTE (e.g., TTE 232, FIG. 7). The Subscriber Call Data Creation process begins (block 300) when an "initiating communication unit" (i.e., a communication unit that initiates a call) first attempts a call (e.g., the communication unit dials a number).

When an initiating communication unit is a TTE, the initiating communication unit attempts a call through its associated GW, referred to herein as the "initiating GW". An "initiating satellite" is a satellite servicing the TTE's initiating GW.

When an initiating communication unit is a SU, the initiating communication unit attempts a call directly to an initiating satellite, which is a satellite in whose cell pattern the initiating communication unit is located. A SU's initiating GW is a GW servicing the region which the initiating communication unit is located within.

When an "initiating satellite" receives a call attempt (block 302) from the initiating communication unit, the initiating satellite desirably increments its Call Attempt Count (block 304) which is stored in satellite resident memory 94 (FIG. 5).

The initiating satellite determines whether or not it has available resources to handle the call (block 306). When the initiating satellite cannot handle the call (block 306), the procedure exits (block 316).

When the initiating satellite can handle the call (block 306), the initiating GW sets up a CDR for that call (block 308). Each CDR desirably includes the initiator RC (i.e., desirably the RC identifying the region in which an initiating communication unit is located), the responder RC (i.e., desirably the RC identifying the region in which a responding communication unit is located), the start time of the call, the device types, data rates, and traffic type (e.g., voice, data/fax, paging, etc.).

The "responding GW" (e.g., desirably a GW servicing the region which the responding communication unit is located within) may also set up a CDR describing the responding communication unit's side of the call.

The procedure then determines when a call is disconnected (block 312). When the call is not disconnected (block 312), the procedure iterates as shown. When the call is disconnected (block 312), the GWs complete the CDRs associated with that call (block 314).

A "disconnecting communication unit" may be either the initiating communication unit or the responding communication unit, depending upon who disconnects the call (e.g., the communication unit that "hangs up"). The call disconnect time is desirably included in each CDR. A CDR may also include the RC for the region in which the disconnecting communication unit was located when it disconnected the call. A CDR may be considered complete when the call disconnect time and the disconnecting communication unit's RC are included within the CDR.

After the CDRs are completed (block 314), the procedure then exits (block 316).

CDRs contain important data used in the creation of a Subscriber Traffic Prediction, including the duration of each call, etc. The Call Attempt Count, which does not contain duration information, also is an important value, because SCS 28 (FIG. 1) should know how many total call attempts were made so that SCS 28 may make an accurate future Subscriber Traffic Prediction. A CDR is not created for call attempts which failed at the initiating satellite. Therefore, the number of calls on the communication system indicated by CDRs may be lower than the total of the Call Attempt Counts tallied by the satellites. For example, if a Subscriber Traffic Prediction within a particular region were based solely on the past amount of successful calls (e.g., a value based on the number of CDRs), the prediction could reflect a lower number of calls than may be actually attempted.

Call Attempt Counts are desirably transmitted by satellites 12 (FIG. 1) to SCS 28 in telemetry messages. The CDRs are desirably sent by GWs 22 to SCS 28. SCS 28 sorts and stores this subscriber data in a Traffic History Database, desirably located in SCS resident memory 192 (FIG. 2).

As would be understood by those of skill in the relevant art based on the description herein, CDRs are created, and Call Attempt Counts are updated when either TTEs or SUs are either the initiating or the responding communication units, or both.

3. Traffic Prediction Factors

As defined herein, a "Time Span" is a bounded, contiguous period of time (e.g.., 9:00 a.m. Greenwich Mean Time (GMT) through 3:00 p.m. GMT). Also as defined herein, a "Time Set" is any combination of Time Spans. A Time Set may be contiguous (e.g., 9:00 a.m. GMT through 3:00 p.m. GMT), periodic (e.g., Mondays), or described by an event (e.g., a flood).

SCS 28 makes a Subscriber Traffic Prediction based on several prediction parameters included within a Traffic Prediction Request. These prediction parameters desirably include: a specific region (or regions), a particular traffic type (or types), and a defined Time Set. For example, SCS 28 may be requested to make a prediction for: RCs #178, and #179 (regions); for voice traffic (traffic type); and for all Mondays in October next year, between 5:00 p.m. GMT, and 6:00 p.m. GMT (Time Set). Each Subscriber Traffic Prediction pertains to one or more specific regions, and types of SU, and spans a particular Time Set.

Figure 10:
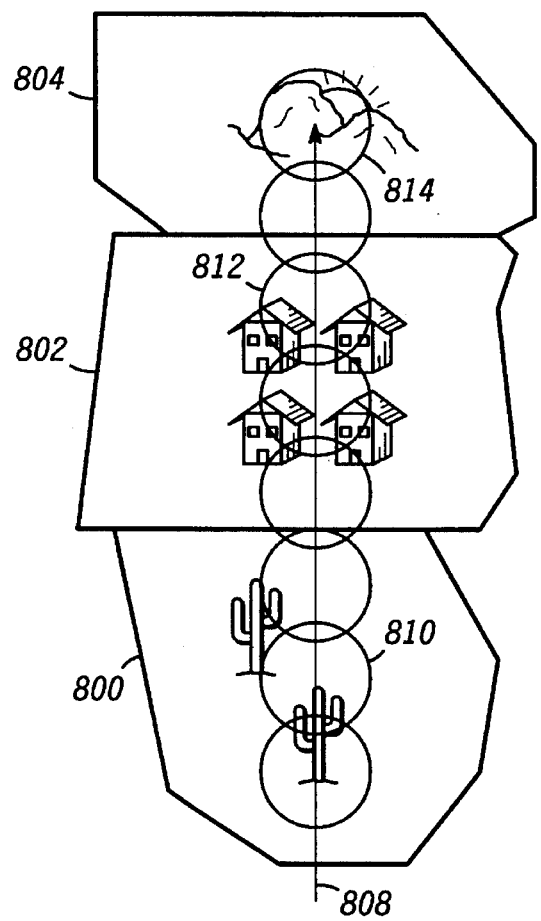
FIG. 10 shows an example of the movement of satellite cell pattern projections over regions on the surface of the earth in accordance with the present invention.

The specific region is relevant to a Subscriber Traffic Prediction, because Subscriber traffic demand in different regions may vary dramatically. FIG. 10 shows an example of the movement (e.g., movement in an orbit) of cell pattern projections 810, 812, 814 over regions 800, 802, 804 on the surface of the earth in accordance with the present invention. At a first time, projection 810 is located in region 800. At a second time, projection 812 is located in region 802. At a third time, projection 814 is located in region 804. Regions 800, 802, 804 are on the surface of the earth. For example, region 800 may be a sparsely populated area, region 802 may be a heavily populated area, and region 804 may be another sparsely populated area.

Figure 11:
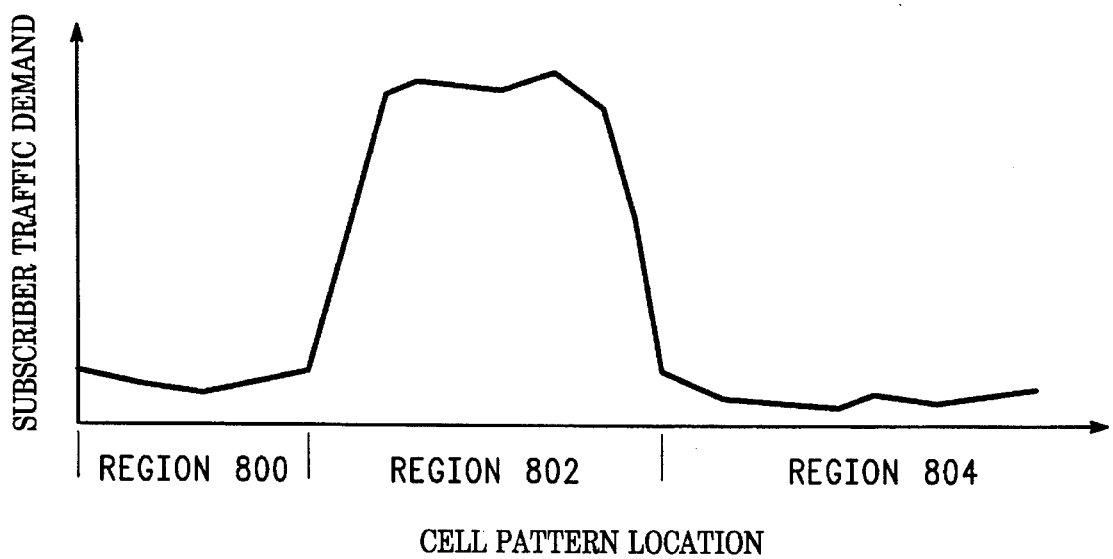
FIG. 11 shows a hypothetical graph of varying Subscriber traffic demand over different regions for a discrete point in time in accordance with the present invention.

Subscriber traffic demand generally varies within different regions. FIG. 11 shows a hypothetical graph of different Subscriber traffic demand over different regions for a particular point in time in accordance with the present invention. Subscriber traffic demand may be described by number of calls per minute, or number of data packets per minute, for example. FIG. 11 shows that Subscriber traffic demands in sparsely populated regions 800, 804 are significantly less than Subscriber traffic demand in heavily populated region 802.

Which traffic types (e.g., voice, paging) a Traffic Prediction Request specifies is also relevant to the prediction. A traffic prediction is desirably based on: how many of a particular SU type are active within a specific region; the frequency of use (e.g., the average number of times used per day); the duration of use (i.e., the length of each communication); and other factors. This information is necessary to predict how much of a certain traffic type should be expected. For example, a particular region may have 5000 pagers and zero cellular telephones. A traffic prediction would include expected paging traffic corresponding to 5000 units and no voice traffic.

The specific region, the traffic types, and the Time Set are parameters that bound the prediction. However, other "Events" affect the Subscriber traffic demand seen within these prediction boundaries. An illustrative list of Events includes:

Temporal Events. For example, traffic may be heavier within a region during working hours than in the middle of the night. Or, traffic may be heavier on Mondays than Sundays.

Cultural Events. For example, traffic may be heavier on Mother's Day than it would be during a non-holiday for a particular region.

Catastrophic Events. For example, during a flood or a snow storm, when traditional ground-based communication systems may be inoperable, traffic for a satellite cellular system may be required to handle the increased traffic due to emergency control, and calls from concerned family members.

Geopolitical Events. For example, subscriber link interference restrictions imposed by some countries would affect the use of the communication system. If system use were forbidden within a country, traffic emanating from the country would be light or non-existent.

Marketing Events. Subscriber traffic demand may be affected, for example, when a large quantity of SUs are sold within a particular region, or when there is a promotional rate offered for service.

Besides affecting a Subscriber Traffic Prediction, Events may also be used to specify prediction parameters. For example, SCS 28 may be requested to make a Subscriber Traffic Prediction for the next flood occurring in RC #221.

Figure 12:
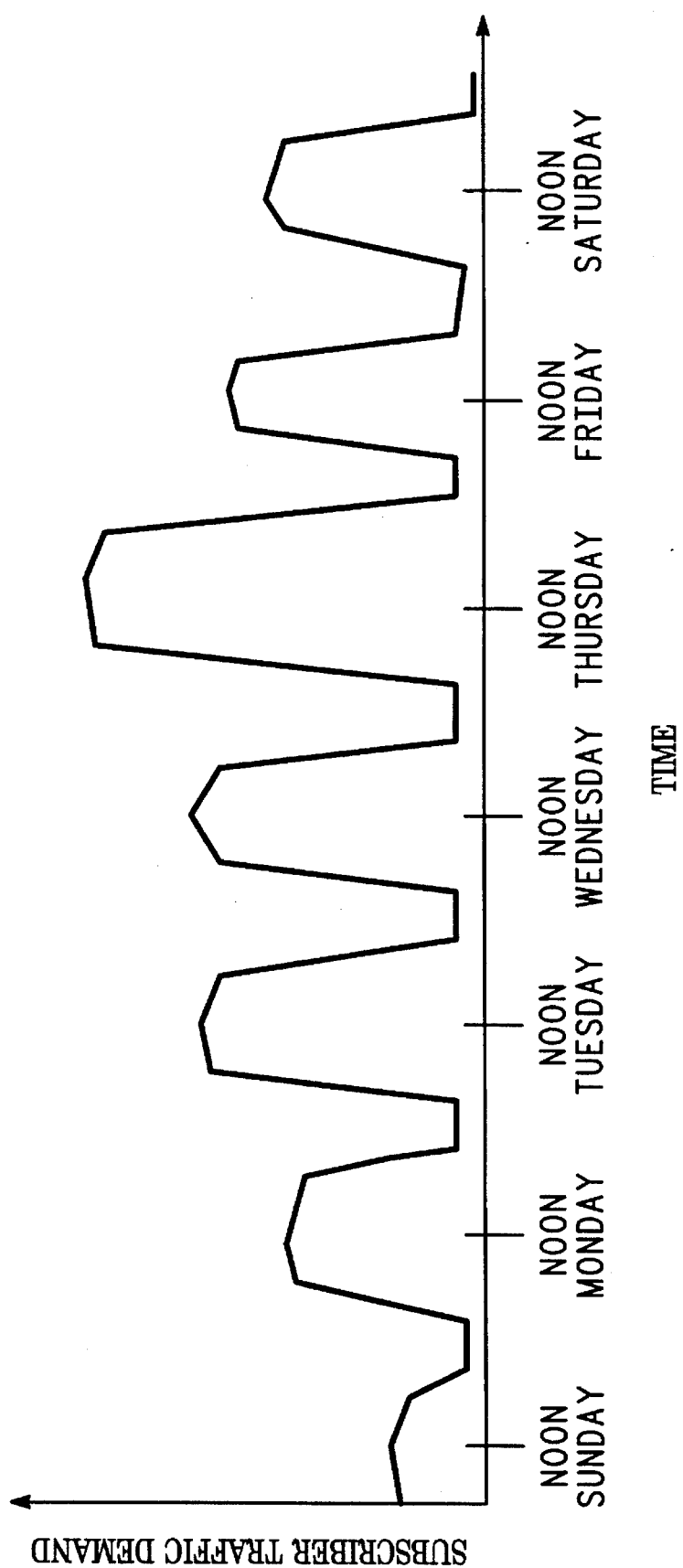
FIG. 12 shows a hypothetical graph of varying Subscriber traffic demand within a particular region as a function of temporal events in accordance with the present invention.

FIG. 12 shows a hypothetical graph of the change in Subscriber traffic demand within a particular region as a function of temporal Events in accordance with the present invention. The graph shows an example of Subscriber traffic demand for one week. Traffic demand is highest around noon-time, and lowest during the evenings, illustrating that traffic demand is generally heavier during daylight hours. Also, as illustrated, weekday traffic is generally heavier than weekend traffic, due to increased use of pagers, and cellular telephones during working hours. For the present example, assume that Sunday traffic demand illustrates normal weekend traffic for the region, and that Monday traffic demand represents normal weekday traffic.

Assume, for example, that on Tuesday, a marketing Event occurred wherein 1000 new cellular telephones were sold and activated within the particular region, explaining the increase in traffic between Monday, and the rest of the weekdays. On Thursday, assume the cultural Event of Mother's Day occurred, explaining even higher than normal weekday traffic. On Saturday, the catastrophic Event of a major power outage occurred, explaining the higher than normal weekend traffic.

A Subscriber Traffic Prediction is desirably derived from relevant CDRs, and Call Attempt Counts received by SCS 28 (FIG. 1). The relevant CDRs, and Call Attempt Counts desirably originate from GWs 22, and satellites 12, respectively. For example, if the SCS 28 is making a Subscriber Traffic Prediction for RC #221 for next Monday, October 10 from 5:00 p.m. GMT through 6:00 p.m. GMT, then CDRs, and Call Attempt Counts which were generated during previous Mondays between 5:00 p.m. GMT, and 6:00 p.m. GMT for RC #221 would be relevant to the prediction.

Table 1 shows hypothetical effects of different prediction parameters on the number of CDRs (and/or Call Attempt Counts). In Table I, the first entry is used as a starting example, and each following entry deviates by one parameter (either the region, Time Set, traffic type, or Event) from the first entry.

TABLE I

Effect of Region, Time Set, Traffic Type, and Events on # CDRs

| Region | Time Set | Traffic Type | Events | # CDRs |
|---|---|---|---|---|
| Rockville, Md | Monday 2–3 p.m. | voice | Monday | 97 |
| Ocean City, Md | Monday 2–3 p.m. | voice | Monday | 6 |
| Rockville, Md | Monday 10–11 p.m. | voice | Monday | 14 |
| Rockville, Md | Monday 2–3 p.m. | pager | Monday | 52 |
| Rockville, Md | Monday 2–3 p.m. | voice | Mother's Day | 410 |

4. Method of Managing System Resources

Figure 13:
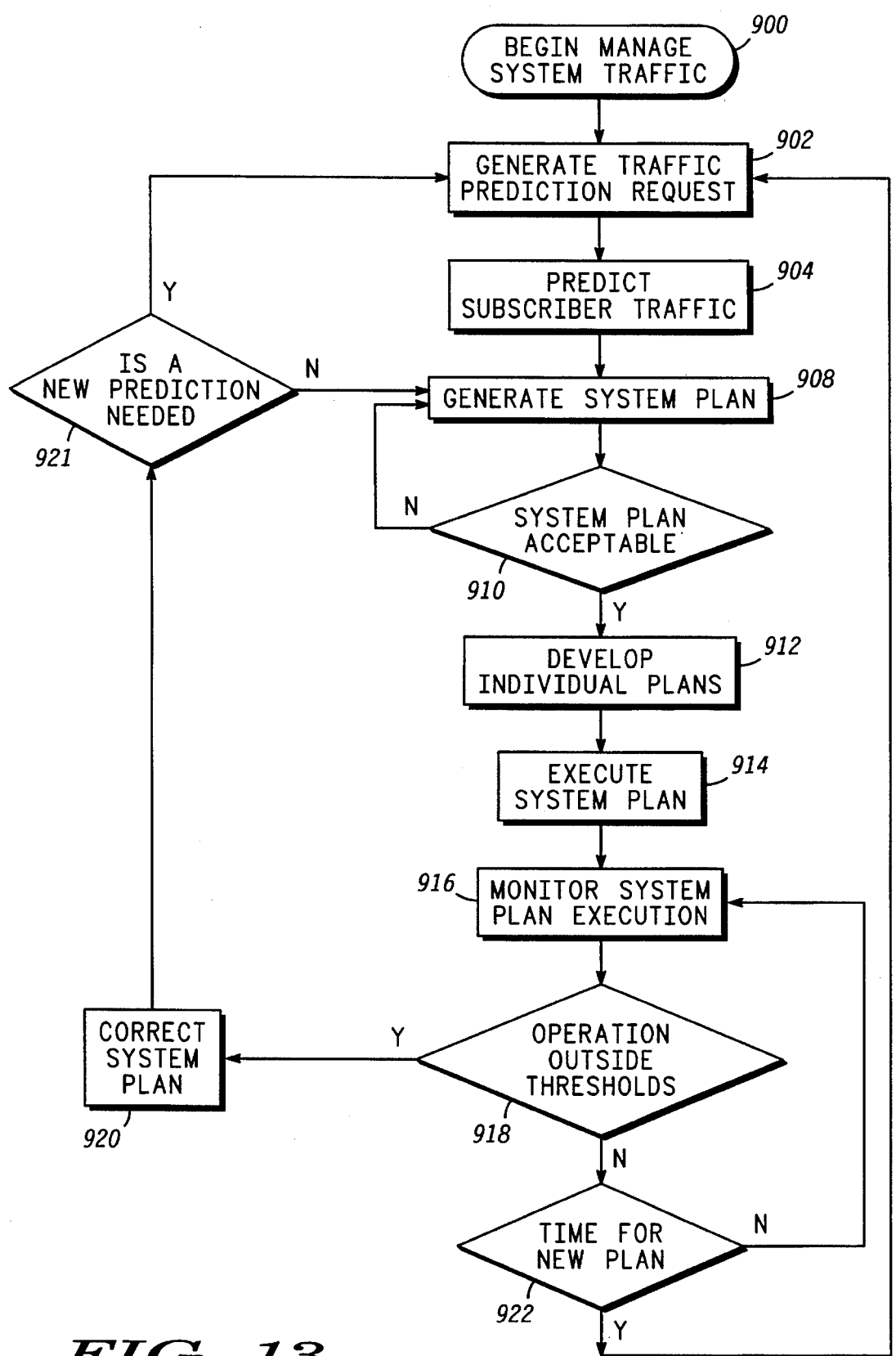
FIG. 13 illustrates a flow chart of a method for managing system resources in accordance with the present invention.

In the present invention, management of a communication system's resources depends on a prediction of Subscriber traffic demand. FIG. 13 illustrates a flow chart of a method for managing system resources in accordance with the present invention. This invention comprises an automated system, and method for managing the resources of a communication system while globally accommodating Subscriber traffic demand.

A preferred embodiment of the invention is based on creating a System Operational Plan, in advance, for each System Node to follow during a future specified Time Set. Processing is desirably carried out predominantly within SCS 28 (FIG. 2), except the Execute System Plan function (block 914, FIG. 13) which is desirably carried out within the individual System Nodes.

The System Operational Plan contains upper bounds, or thresholds, which System Nodes should not exceed during actual operation. In other words, the System Nodes should operate within the bounds of the System Operational Plan even if actual Subscriber traffic during the specific Time Set is much heavier than predicted.

The Manage System Traffic method begins (block 900) by generating a "Traffic Prediction Request" (block 902). A Traffic Prediction Request is a request for Subscriber Traffic Prediction specifying particular Time Set (s), region(s), and traffic type(s). The Traffic Prediction Request is generated by either a performance monitoring event (e.g., Correct System Plan (block 920)) or by a routine planning event (e.g., Time for New Plan (block 922)).

Four general Traffic Prediction Request types are identified herein; however, an advantage of the present invention is that more types may be readily incorporated into the design. These four types are: a cell request (e.g., request for prediction of traffic seen by a specific cell at one point in time); satellite request (e.g., request for prediction of traffic seen by a specific satellite at one point in time); path request (e.g., request for prediction of traffic seen by a particular satellite for a Time Set); and geographic request (e.g., prediction request for prediction of traffic seen within a particular geographic area). The Traffic Prediction Request type will desirably indicate how a particular Traffic Prediction Request should be decomposed into Regional Traffic Requests as described in Section C.6. below. Different Traffic Prediction Request types provide a method to specify combinations of Regional Traffic Requests in high level terms.

Next the Predict Subscriber Traffic function (block 904) predicts various types of Subscriber traffic (e.g., voice, fax, paging) in conformance with the Traffic Prediction Request. The answer to the request is a Subscriber Traffic Prediction, which may then be used to provide resolution of anomalies detected by the Monitor System Plan process (block 916), or to support the Generate System Plan process (block 908). The Predict Subscriber Traffic function (block 904) is explained in more detail in Section C.6. below.

After the Predict Subscriber Traffic process (block 904) is performed, the Generate System Plan process (block 908) produces a System Operational Plan for the specified Time Set. The Generate System Plan process (block 908) generates a System Operational Plan to meet predicted service requirements during the future Time Set, given available system resources, and system contractual requirements. Generation of a new System Operational Plan is based on "planning criteria," which are high level constraints on the Generate System Plan process (block 908). Planning criteria may include, for example, contractual requirements which specify minimally acceptable system performance. For example, contractual requirements may specify instructions on how to assign channels, power constraints, or assigning priorities to users by regions or Events (e.g., providing additional access opportunities to a particular region during an emergency).

The System Operational Plan may be thought of as a large matrix in which resource usage of all System Nodes is balanced at the system level. The System Operational Plan contains directives for each System Node to follow during plan execution (e.g., which direction a satellite should route data on its cross-links, which access priorities are being serviced by a cell, when to turn certain cells on or off, which antenna are assigned for an up-link, and so forth). The System Operational Plan also desirably includes "thresholds" of resource usage which System Nodes may not exceed during execution of the System Operational Plan (e.g., maximum number of calls the System Node may handle at a certain time).

A new System Operational Plan is desirably generated on a periodic basis (e.g., once per day). Generation of a System Operational Plan entails planning how the Subscriber Traffic Prediction could be accommodated by the system.

The System Operational Plan may not satisfy all the predictions of the Subscriber Traffic Prediction. Thus, the Generate System Plan process (block 908) also desirably creates metrics which describe how well the System Operational Plan was able to provide service.

A System Operational Plan desirably includes:

an overall node-to-node routing plan;

channel allocations for each cell of each satellite;

down-link, cross-link, and up-link antenna assignments;

cell activation tables specifying when to activate or deactivate each cell of each satellite; and access priority tables specifying when particular SUs may access the system based on priority numbers which are stored in SU resident memory 118 (FIG. 4).

Using the metrics from the Generate System Plan process (block 908), the System Operational Plan is evaluated, and a determination is made (block 910) whether or not the System Operational Plan is acceptable. If it is determined (block 910) that the System Operational Plan met all planning criteria, the System Operational Plan may be considered acceptable. If not, the evaluation considers (block 910) whether any planning criteria could be altered to improve system performance (e.g., to better meet contractual requirements), or whether the System Operational Plan is the best the system can do given the resources available during the specified Time Set with the Subscriber Traffic Prediction. Even when all contractual requirements are not met, a System Operational Plan may be considered acceptable when it is determined that the projected system performance is the best the system can do given the available resources.

When a System Operational Plan is considered acceptable (block 910) or the best the system can do, the Develop Individual Plan process (block 912) determines each System Node's unique portion of the System Operational Plan, and distributes each System Node's unique portion to each System Node.

Next, the Execute System Plan process (block 914) occurs when each System Node begins operating in accordance with its unique portion of the System Operational Plan during the specific Time Set for which the System Operational Plan was created.

Operating in accordance with the System Operational Plan includes activities such as routing data packets according to the node-to-node routing plan, activating, and deactivating cells of each satellite according to the cell activation plan, etc.

Next, the Monitor System Plan Execution process (block 916) monitors execution of the System Operational Plan, including health, and status of the System Nodes. The Monitor System Plan Execution process (block 916) entails comparing actual system operation data during the Time Set with thresholds, and constraints within the executing System Operational Plan. When the Monitor System Plan Execution process (block 916) determines that the system is or will soon be operating outside allowable thresholds (block 918), the Correct System Plan process (block 920) takes corrective action.

Depending upon how far the System Operational Plan is operating out of allowable thresholds, or on the potential effects of such out-of-tolerance operation, the Correct System Plan process (block 920) decides whether to allow the System Operational Plan to continue to execute, or it may initiate creation of a partial or entirely new System Operational Plan to replace the currently executing System Operational Plan.

When the Correct System Plan process (block 920) determines that a new System Operational Plan is needed, a determination is made whether a new Traffic Prediction is needed (block 921). A new Traffic Prediction may be needed, for example, when an Event has occurred between the time the previous Traffic Prediction was generated which is likely to have a substantial effect on subscriber traffic. When no new Traffic Prediction is needed (block 921), the Generate System Plan process (block 908) is invoked and the procedure iterates as shown. When a new Traffic Prediction is needed (block 921), the Generate Traffic Prediction Request process (block 902) is invoked and the procedure iterates as shown.

When the Monitor System Plan Execution process (block 916) does not detect that the System Operational Plan is unacceptably operating outside allowable thresholds (block 918), a determination is made whether it is time to generate a new System Operational Plan (block 922) for a future Time Set. When it is time to generate a new System Operational Plan (block 922), the Generate Traffic Prediction Request process (block 902) is invoked, and the method iterates as shown in FIG. 13.

The Monitor System Plan Execution process (block 916), and the Generate System Plan process (block 908) desirably may occur simultaneously. A System Operational Plan for a future Time Set is desirably generated (block 908) during a currently executing Time Set. Therefore, the Monitor System Plan Execution process (block 916) for the currently executing Time Set continues to run at the same time that the Generate System Plan process (block 908) is generating the System Operational Plan for a future Time Set.

5. Maintenance of Traffic Databases

A Subscriber Traffic Prediction is based on a Traffic History Database, and a Traffic Model Database desirably stored within SCS resident memory 192 (FIG. 2). In a preferred embodiment, the Traffic History Database may be thought of as a three dimensional matrix, each location being defined by a region, a Time Span, and a traffic type (e.g., voice, paging, data/fax, voice mail, etc.).

Figure 14:
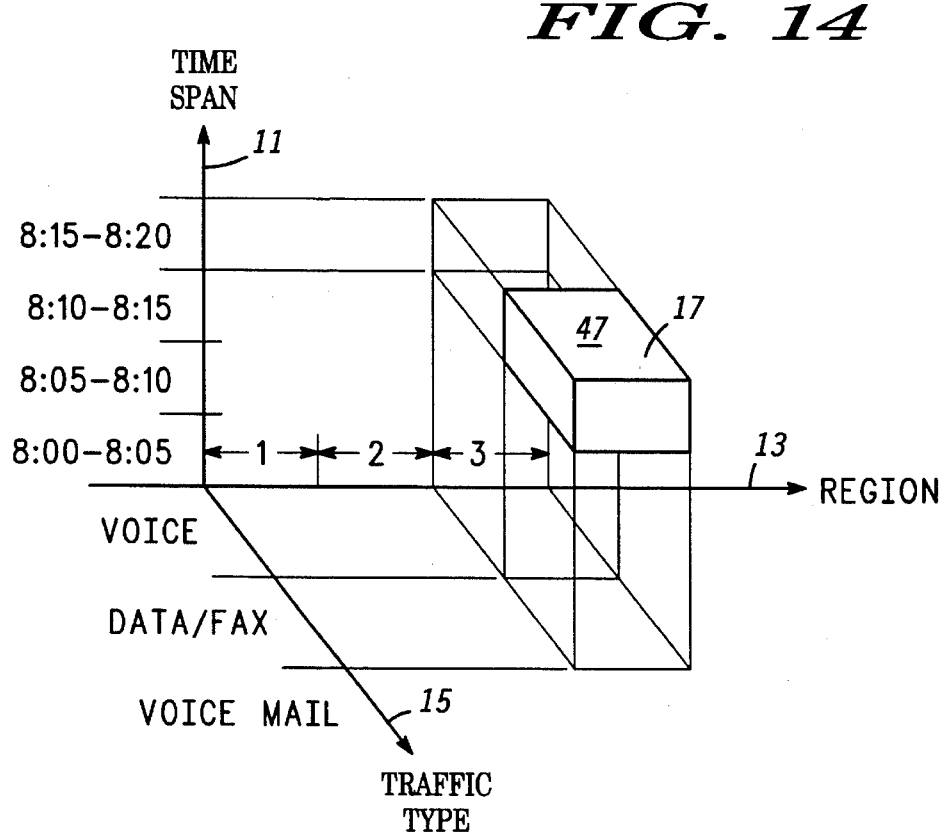
FIG. 14 illustrates a hypothetical structure of a Traffic History Database in accordance with the present invention.

FIG. 14 illustrates a hypothetical structure of a Traffic History Database. For example, the region axis 13 is a sequential list of RCs, the Time Span axis 11 is broken into contiguous five minute increments, and the traffic type axis 15 includes all known traffic types of the system. One location in the matrix is illustrated by location 17. Each location desirably contains an indication of the quantity of traffic corresponding to that particular region, Time Span, and traffic type.

Each accepted CDR is associated with one or more traffic types, Time Spans, and regions. For example, a specific CDR may describe a data/fax call that occurred between 8:15 p.m. GMT, and 8:20 p.m. GMT in RC #3. The CDR received by SCS 28 (FIG. 1) is sorted to determine which location in the matrix it corresponds to, or "intersects". The example CDR would intersect location 17 shown in FIG. 14.

The number of CDRs intersecting each location is counted and stored in the corresponding location. For example, forty-seven CDRs are shown to have intersected location 17. Call Attempt Counts may also be stored in the same location 17. An intersecting CDR need not always be factored into a count for a particular location, as for example, when the intersection is very minimal (e.g., by only 2 seconds).

Different database structures may be used as would be obvious to those of skill in the art based on the description herein. Additionally, the indications of the quantity of traffic may be based on some traffic indicator other than CDRs, such as number of data packets emanating from a region, or Call Attempt Counts, for example.

6. Preferred Method of Predicting Traffic

Figure 15:
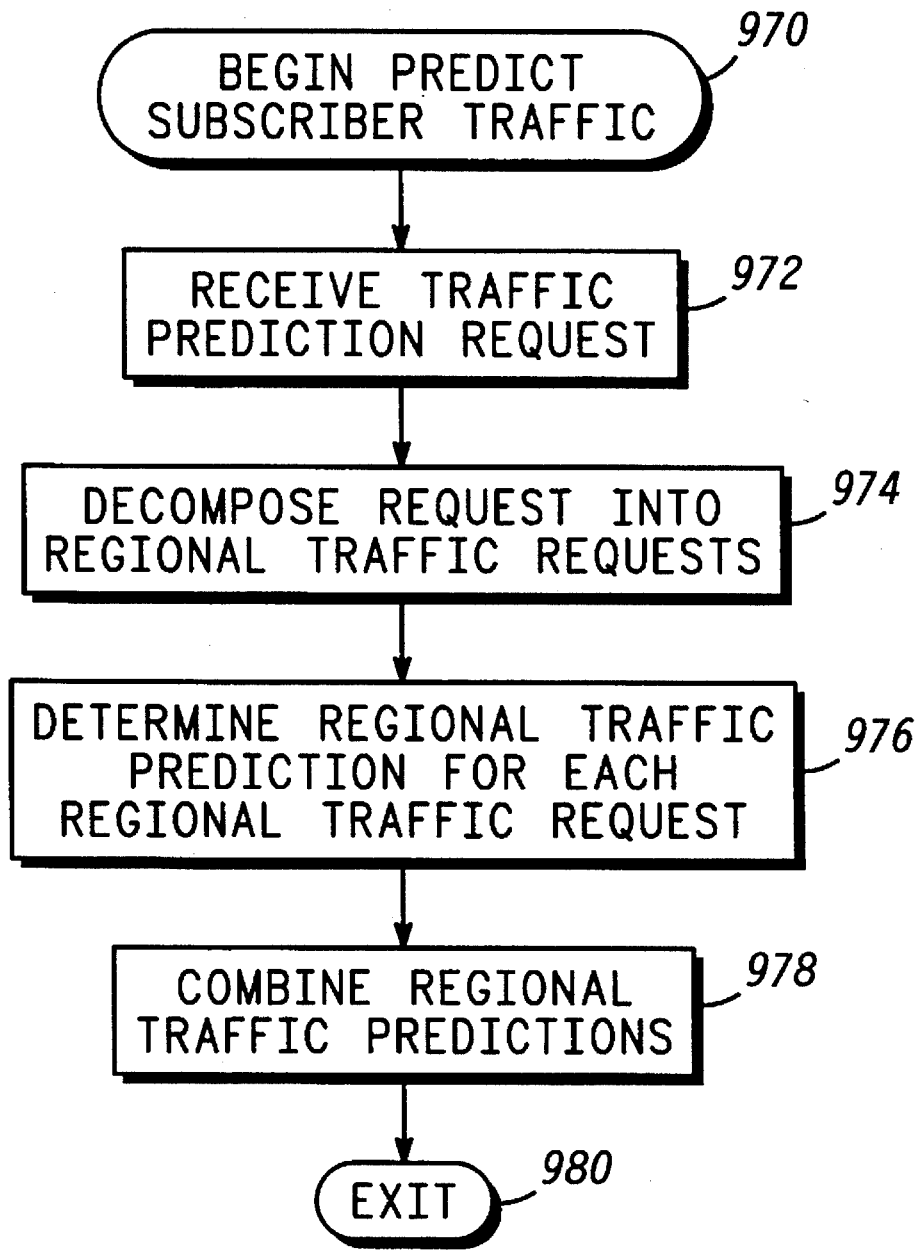
FIG. 15 illustrates a flow chart of a method for determining a Subscriber Traffic Prediction in accordance with the present invention.

FIG. 15 illustrates a flow chart of a method for determining a Subscriber Traffic Prediction in accordance with the present invention. Referring to FIG. 15, the Predict Subscriber Traffic function (block 904, FIG. 13) begins (block 970) when a Traffic Prediction Request is received (block 972) from the Generate Traffic Prediction Request process (block 902, FIG. 13).

The Traffic Prediction Request is then decomposed into Regional Traffic Requests (block 974). Decomposition depends on which type of Traffic Prediction Request (e.g., geographic, cell, satellite, or path) is received.

A geographic Traffic Prediction Request is desirably decomposed into Regional Traffic Requests for the regions intersecting a particular geographic area at a particular point in time. A geographic Traffic Prediction Request, for example, may be a Traffic Prediction Request for a Subscriber Traffic Prediction for all of South America. The geographic Traffic Prediction Request would be decomposed into separate Regional Traffic Requests for each region intersecting South America.

A cell Traffic Prediction Request is desirably decomposed into Regional Traffic Requests for the regions over which the particular cell is located at one point in time. A cell Traffic Prediction Request, for example, may be a Traffic Prediction Request for cell #16 of satellite #27 for a specific point in time. Decomposition would be performed by first determining the "ephemeris" of the satellite (i.e., at what point the satellite should be located at the relevant time), then determining which regions the satellite should be projecting its cell pattern onto during that time based on this ephemeris.

Similarly, a satellite Traffic Prediction Request is desirably decomposed into Regional Traffic Requests for the regions over which the entire cell pattern is located at one point in time.

Finally, a path Traffic Prediction Request is desirably decomposed into Regional Traffic Requests for the regions over which a particular satellite's cell pattern will pass during a requested Time Set or portion of an orbit. A path Traffic Prediction Request is decomposed by determining the ephemeris of the satellite for the desired Time Set, and decomposing it into the regions over which the satellite's cell pattern will pass during the Time Set. A path Traffic Prediction Request may apply to one cell, one satellite, or a set of satellites, for example. Additionally, where a geographic Traffic Prediction Request, a cell Traffic Prediction Request, and a satellite Traffic Prediction Request correspond to fixed points in time, a path Traffic Prediction Request corresponds to a particular Time Set.

Referring again to FIG. 15, a Regional Traffic Prediction is determined (block 976) for each Regional Traffic Request. The Regional Traffic Prediction is desirably a statistical prediction of the quantity of Subscriber traffic which should be seen in accordance with the Regional Traffic Request.

Figure 16:
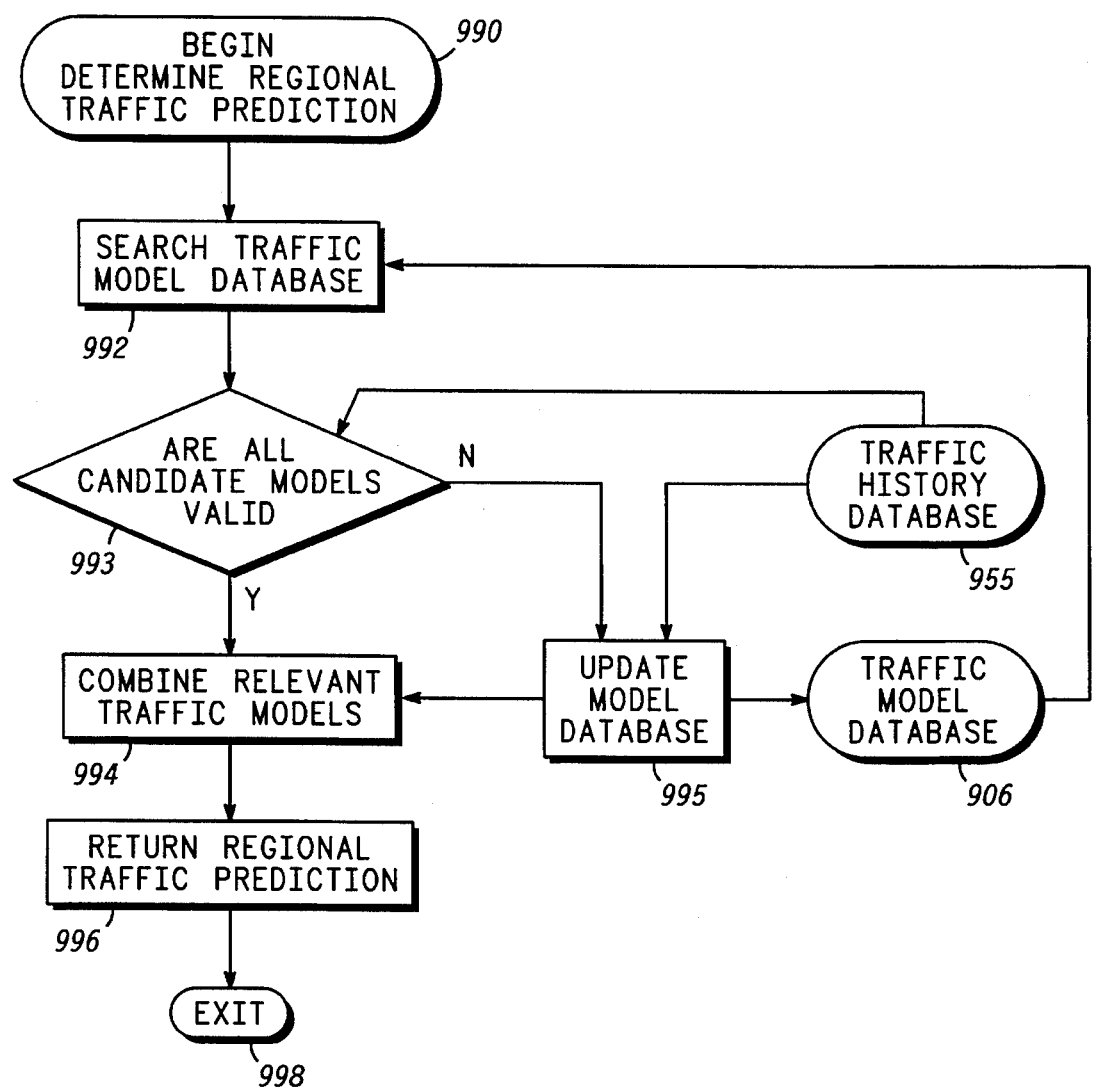
FIG. 16 illustrates a flow chart of a method for determining a Regional Traffic Prediction in accordance with the present invention.

FIG. 16 illustrates a flow chart of a method for determining a Regional Traffic Prediction in accordance with the present invention. The Determine Regional Traffic Prediction process begins (block 990) by performing the Search Traffic Model Database process (block 992) which evaluates the Traffic Model Database (block 906) to determine Traffic Models which are relevant to the Regional Traffic Request.

"Traffic Models" are statistical descriptions (e.g., Gaussian distributions; however, other statistical methods of modeling may also be used) of past traffic patterns for a particular region, traffic type, and Event. For example, a particular Traffic Model may describe cellular telephone traffic in RC #13 for Monday traffic between 5:00 p.m. GMT and 6:00 p.m. GMT. Traffic Models are desirably generated from data contained within the Traffic History Database (block 955). Therefore, the example Traffic Model would be based on data in the Traffic History Database (block 955) intersecting previous Mondays between 5:00 p.m. GMT and 6:00 p.m. GMT for cellular telephone traffic in RC #13.

The region(s), traffic type(s), and Event(s) describing a particular Traffic Model are called "Validity Flags". Each Regional Traffic Request will desirably contain request parameters which may be matched against Validity Flags to locate a Traffic Model which may be used to answer the Regional Traffic Request. When the Validity Flags associated with a Traffic Model indicate that the Traffic Model is relevant to the Traffic Prediction Request the Traffic Model is considered a "Candidate Model".

The Search Traffic Model Database process (block 992) results in a set of Candidate Models. The set may be a null set (i.e., it may contain no Candidate Models because no relevant Traffic Models were found).

A determination is made (block 993) whether all Candidate Models are valid (e.g., whether they accurately reflect subscriber traffic). This is done by evaluating historical data from the Traffic History Database (block 955) describing actual call activity within the region. For example, if a Candidate Model indicates that ten cellular telephone calls should be seen in a particular region at a particular time, but the Call Attempt Counts indicate that 200 call attempts were actually made, the Candidate Model would not accurately reflect call activity and would be declared invalid (block 993).

When all Candidate Models are valid (block 993), the Combine Relevant Traffic Models procedure (block 994) is executed.

When a Candidate Model is invalid (block 993), or when no Candidate Models were found, the Update Model Database function (block 995) is invoked to regenerate the invalid Candidate Model, or to generate a new Traffic Model. The replacement or new Traffic Model is then stored in the Traffic Model Database (block 906).

Regeneration of a Candidate Model, or generation of a new Traffic Model is desirably accomplished by first extracting data from the Traffic History Database (block 955) which is relevant to the Traffic Prediction Request parameters. A new Traffic Model is then generated and stored, replacing the invalid Traffic Model if one exists.

In an alternative embodiment, the Traffic Model Database (block 906) may be maintained on a continuing basis, rather than when new Subscriber Traffic Requests come in. This could be accomplished by regenerating and deriving new Traffic Models on a periodic (e.g., once per week) or aperiodic basis as incoming subscriber traffic data is incorporated into the Traffic History Database (block 955).

The original and regenerated Candidate Models, and the new Traffic Models are combined (block 994) to produce a Regional Traffic Prediction. The Regional Traffic Prediction is then returned (block 996) to the Predict Subscriber Traffic procedure (FIG. 15), and the Determine Regional Traffic Prediction procedure exits (block 998, FIG. 16).

Referring back to FIG. 15, a Regional Traffic Prediction is determined (block 976) for each of the decomposed Regional Traffic Requests. The Combine Regional Traffic Predictions process (block 978) combines all Regional Traffic Predictions into a consolidated Subscriber Traffic Prediction which answers the Regional Traffic Request. The Predict Subscriber Traffic procedure then exits (block 980).

Thus, an improved method, and apparatus for predicting Subscriber traffic within a cellular communication system has been described which overcomes specific problems, and accomplishes certain advantages relative to prior art methods, and mechanisms. The method, and apparatus provide for accurate predictions of cellular Subscriber traffic to be made for a satellite system where such predictions are critical for acceptable management of limited system resources. Additionally, the automated nature of the method allows for rapidly generating predictions. This allows timely responses to Traffic Prediction Requests which may be needed when the system is or will soon be operating above allowable thresholds.

An additional advantage is the flexibility of the invention. The method allows for new Traffic Models to be created, and used for Subscriber Traffic Predictions. Also, because the method is capable of handling different Traffic Prediction Request types, a system user or administrator is able to query the system using high-level descriptions of regions and Time Sets.

The foregoing description of the specific embodiments will so fully reveal the general nature of the invention that others can, by applying current knowledge, readily modify, and/or adapt the embodiments for various applications without departing from the generic concept. Therefore, such adaptations, and modifications should, and are intended to be comprehended within the meaning, and range of equivalents of the disclosed embodiments. In particular, while a preferred embodiment has been described in terms of a satellite cellular telecommunications system and method, those of skill in the art will understand, based on the description herein, that the system and method of the present invention are not limited to satellite cellular networks, but apply equally well to other types of multi-nodal telecommunications systems whose resource management in individual System Nodes is important, as for example, but not limited to, terrestrial cellular or land-line systems. Additionally, the method of the present invention may apply equally well to geostationary, and geosynchronous satellites as well as to satellites that move with respect to the surface of the earth.

It is to be understood that the phraseology or terminology employed herein is for the purpose of description, and not of limitation. Accordingly, the invention is intended to embrace all such alternatives, modifications, equivalents, and variations as fall within the spirit, and broad scope of the appended claims.

What is claimed is:

1. In a communication system comprising
   a system control segment,
   one or more subscriber units dispersed throughout one or more geographical regions, and
   one or more routing devices which support communication traffic from the subscriber units and which exchange system information with the system control segment,
   a method for predictively controlling operations of the communication system comprising the steps of:
   a. creating, by the system control segment, a subscriber traffic prediction of future traffic during a future time set, the subscriber traffic prediction based on historical traffic data correlated with the geographical regions that the one or more routing devices will support during the future time set and also correlated with previous temporal events having characteristics of the future time set;
   b. generating, by the system control segment, a system operational plan for at least the future time set based on the subscriber traffic prediction;
   c. sending a portion of the system operational plan to each of the one or more routing devices;
   d. executing the portion of the system operational plan during the future time set, by the one or more routing devices, by conforming operations to the system operational plan during the future time set; and
   e. before an end of the future time set, creating a next subscriber traffic prediction for a next future time set and repeating steps b–e using the next subscriber traffic prediction for the next future time set.

2. A method as claimed in claim 1 wherein the subscriber units may utilize different routing devices at different times, and step (a) further comprises the steps of:
   a.1. receiving a traffic prediction request which specifies the future time set for which the subscriber traffic prediction is desired;
   a.2. decomposing the traffic prediction request into one or more regional traffic requests, wherein the regional traffic requests correspond to regions on the surface of a celestial body supported by the one or more routing devices during the future time set;
   a.3. determining regional traffic predictions for each of the one or more regional traffic requests, wherein a regional traffic prediction is a prediction of the communication traffic from the subscriber units located within the region; and
   a.4. combining the regional traffic predictions for each of the regions.

3. A method as claimed in claim 2 wherein the one or more routing devices move with respect to the regions and step (a.2) comprises the steps of:
   a.2.1. predicting locations of the one or more routing devices during the future time set; and
   a.2.2. determining, from the locations, the regions for which the one or more routing devices will support communication traffic.

4. A method as claimed in claim 2 wherein step (a.3) comprises the steps of:
   a.3.1. searching a traffic model database containing traffic models for a set of candidate traffic models which are relevant to the one or more regional traffic requests;
   a.3.2. if the set of candidate traffic models is a null set, generating one or more new traffic models using subscriber traffic data from a traffic history database; and
   a.3.3. combining the set of candidate traffic models, or the one or more new traffic models, into one of the regional traffic predictions.

5. A method as claimed in claim 2 wherein step (a.3) comprises the steps of:
- a.3.1. searching a traffic model database containing traffic models for a set of candidate traffic models which are relevant to the one or more regional traffic requests;
- a.3.2. if the set of candidate traffic models is a null set, generating one or more new traffic models;
- a.3.3. if the set of candidate traffic models is not the null set, determining whether the set of candidate traffic models is valid;
- a.3.4. if the set of candidate traffic models is not the null set and the set of candidate traffic models is not valid, creating regenerated candidate traffic models; and
- a.3.5. combining the one or more new traffic models, or the candidate traffic models, and the regenerated candidate traffic models into one of the regional traffic predictions.

6. A method as claimed in claim 5 wherein step (a.3.3) comprises the steps of:
- a.3.3.1. evaluating data from a traffic history database describing actual traffic within a region;
- a.3.3.2. declaring a particular candidate traffic model invalid when the particular candidate traffic model does not accurately reflect the actual traffic; and
- a.3.3.3. declaring the particular candidate traffic model valid when the particular candidate traffic model does accurately reflect the actual traffic.

7. A method as claimed in claim 5 wherein step (a.3.2) comprises the steps of:
- a.3.2.1. extracting relevant subscriber traffic data from a traffic history database that is relevant to the one or more new traffic models;
- a.3.2.2. generating the one or more new traffic models using the relevant subscriber traffic data; and
- a.3.2.3. updating the traffic model database by storing the one or more new traffic models in the traffic model database;

and wherein step (a.3.4) comprises the steps of:
- a.3.4.1. extracting the relevant subscriber traffic data from the traffic history database that is relevant to the regenerated candidate traffic models;
- a.3.4.2. generating the regenerated candidate traffic models using the relevant subscriber traffic data; and
- a.3.4.3. updating the traffic model database by storing the regenerated candidate traffic models in the traffic model database.

8. A method as claimed in claim 1 wherein step (b) comprises the steps of:
- b.1. determining, by the system control segment, acceptable cross-link usage by the one or more routing devices based on the subscriber traffic prediction; and
- b.2. incorporating the acceptable cross-link usage into the system operational plan.

9. A method as claimed in claim 1 wherein step (b) comprises the steps of:
- b.1. determining, by the system control segment, acceptable down-link usage by the one or more routing devices based on the subscriber traffic prediction and subscriber traffic thresholds; and
- b.2. incorporating the acceptable down-link usage into the system operational plan.

10. A method as claimed in claim 1 wherein the one or more routing devices have antennas and step (b) comprises the steps of:
- b.1. determining antenna assignments, by the system control segment, based on the subscriber traffic prediction and subscriber traffic thresholds; and
- b.2. incorporating the antenna assignments into the system operational plan.

11. A method as claimed in claim 1 wherein the one or more routing devices provide communication channels and step (b) comprises the steps of:
- b.1. determining communication channel allocations, by the system control segment, based on the subscriber traffic prediction and subscriber traffic thresholds; and
- b.2. incorporating the communication channel allocations into the system operational plan.

12. A method as claimed in claim 1 wherein step (b) comprises the steps of:
- b.1. determining, by the system control segment, allowable resource usage thresholds based on the subscriber traffic prediction; and
- b.2. incorporating the allowable resource usage thresholds into the system operational plan.

13. A method as claimed in claim 12 wherein step d) comprises the step of:
- d.1. regulating traffic flow through the one or more routing devices based on the portion of the system operational plan.

14. A method as claimed in claim 13 wherein step d.1) further comprises the step of:
- d.1. refusing to allow one or more subscriber units to access the communication system when actual subscriber traffic exceeds the allowable resource usage thresholds.

15. A method as claimed in claim 13 wherein step d.1) further comprises the step of:
- d.1.1. routing data to other routing devices in conformance with the portion of the system operational plan.

16. A method as claimed in claim 1 wherein step (b) further comprises the steps of:
- b.1. determining, by the system control segment, allowable access numbers which allow certain subscriber units access to the communication system at certain times, the allowable access numbers being based on the subscriber traffic prediction and subscriber traffic thresholds; and
- b.2. incorporating the allowable access numbers into the system operational plan.

17. In a communication system comprising
a system control segment, and
one or more routing devices,
a method for predictively controlling operations of the communication system comprising the steps of:
- a. creating, by the system control segment, a subscriber traffic prediction;
- b. generating, by the system control segment, a system operational plan based on the subscriber traffic prediction; and
- c. executing the system operational plan, by the one or more routing devices, by conforming operations to the system operational plan, wherein step (b) comprises the steps of:
- b.1. determining, by the system control segment, acceptable energy consumption of the one or more routing devices based on the subscriber traffic prediction; and
- b.2. incorporating the acceptable energy consumption into the system operational plan.

18. In a communication system comprising
a system control segment, and
one or more routing devices,
a method for predictively controlling operations of the communication system comprising the steps of:
  a. creating, by the system control segment, a subscriber traffic prediction;
  b. generating, by the system control segment, a system operational plan based on the subscriber traffic prediction; and
  c. executing the system operational plan, by the one or more routing devices, by conforming operations to the system operational plan,
wherein step (b) further comprises the steps of:
  b.1. determining, by the system control segment, allowable access numbers based on the subscriber traffic prediction, and
  b.2. incorporating the allowable access numbers into the system operational plan, and wherein step (c) further comprises the steps of:
  c.1. broadcasting, by the one or more routing devices, the allowable access numbers to subscriber units having resident memory devices containing particular access numbers, and
  c.2. refusing, by the one or more routing devices, to allow subscriber units having the particular access numbers that are different from the allowable access numbers to access communication channels.

19. In a communication system comprising
a system control segment, and
one or more routing devices which provide communication channels,
a method for interfacing subscriber units with the communication system comprising the steps of:
  a. determining, by the system control segment, one or more allowable access numbers based on a subscriber traffic prediction;
  b. broadcasting, by the one or more routing devices, the one or more allowable access numbers; and
  c. utilizing, by the subscriber units, the communication channels when the one or more allowable access numbers broadcast by the one or more routing devices are compatible with particular access numbers contained within resident memory devices of the subscriber units.

20. In a communication system comprising
a system control segment, and
one or more routing devices which provide communication channels,
a method for interfacing a particular subscriber unit with the communication system comprising the steps of:
  a. transmitting, by the particular subscriber unit, identification information to the system control segment where the identification information is used to generate a system operational plan which includes one or more allowable access numbers; and
  b. attempting to utilize, by the particular subscriber unit, one of the communication channels when the one or more routing devices broadcast the one or more allowable access numbers and one of the one or more allowable access numbers is compatible with a particular access number contained within a resident memory device of the particular subscriber unit.

21. In a communication system comprising
a system control segment,
a method for operating the communication system comprising the steps of:
  a. creating, by the system control segment, a subscriber traffic prediction for one or more geographic regions during a future time set, wherein the subscriber traffic prediction is created by utilizing call data records describing call attempts, subscriber units, and calls handled by the subscriber units within the one or more geographic regions;
  b. generating, by the system control segment, a system operational plan that is executed during the future time set based on the subscriber traffic prediction;
  c. sending a portion of the system operational plan to each of the one or more routing devices; and
  d. before an end of the future time set, creating a next subscriber traffic prediction for a next future time set and repeating steps b–d using the next subscriber traffic prediction for the next future time set.

22. In a communication system comprising
a system control segment having a memory device,
one or more routing devices which provide communication channels to a surface of a celestial body, and
multiple subscriber units dispersed throughout one or more geographical regions on the surface of the celestial body, wherein the multiple subscriber units are movable with respect to the surface of the celestial body, and at least two of the multiple subscriber units are capable of exchanging communication traffic with each other over the communication channels,
a method for operating the communication system comprising the steps of:
  a. collecting, by the system control segment, data describing the communication traffic exchanged between the multiple subscriber units;
  b. storing, by the system control segment, the data in a traffic history database located in the memory device;
  c. creating, by the system control segment, a subscriber traffic prediction of future traffic based on the data in the traffic history database wherein the subscriber traffic prediction is correlated with the geographical regions that the multiple subscriber units are dispersed throughout during a future time set; and
  d. controlling operation of the one or more routing devices, by the system control segment during the future time set, based on the subscriber traffic prediction.

23. A method as claimed in claim 22 wherein step (c) comprises the steps of:
  c.1. generating, by the system control segment, traffic models from the data in the traffic history database; and
  c.2. creating, by the system control segment, the subscriber traffic prediction based on the traffic models.

24. A method as claimed in claim 22 wherein step (d) comprises the steps of:
  d.1. generating, by the system control segment, a system operational plan for the future time set based on the subscriber traffic prediction;
  d.2. determining whether the system operational plan is acceptable;
  d.3. if the system operational plan is not acceptable, repeating steps d.1 and d.2;
  d.4. if the system operational plan is acceptable, developing individual plans for the one or more routing devices;

d.5. conforming operations, by the one or more routing devices, to the individual plans;

d.6. monitoring, by the system control segment, actual system operations, and comparing the actual system operations to thresholds contained within the system operational plan;

d.7. if the system operational plan is or soon will be operating outside the thresholds, correcting the system operational plan by repeating steps d.1 through d.4;

d.8. if the system operational plan is not operating outside the thresholds, determining whether a time has come to generate a new system operational plan;

d.9. when the time has not come to generate the new system operational plan, repeating steps d.5 through d.8; and d.10. when the time has come to generate the new system operational plan, repeating steps d.1. through d.8.

25. In a communication system controlled by a system control segment, and comprising one or more routing devices, where at least one of the one or more routing devices moves with respect to a surface of a celestial body, a method for operating the communication system comprising the steps of:
  a. providing communication channels, by the one or more routing devices, for exchanging communication traffic between multiple subscriber units;
  b. broadcasting one or more access numbers, by the one or more routing devices, determined from a subscriber traffic prediction;
  c. allowing, by the one or more routing devices, communication channel access by particular subscriber units having individual access numbers that are compatible with the one or more access numbers broadcast by the one or more routing devices; and
  d. denying, by the one or more routing devices, the communication channel access to other subscriber units when a number of subscriber units attempting to utilize the communication channels exceeds a threshold contained within a system operational plan which is derived from the subscriber traffic prediction.

26. In a communication system controlled by a system control segment, and comprising one or more routing devices, a method for operating the communication system comprising the steps of:
  a. providing one or more communication channels, by the one or more routing devices, for exchanging communication traffic between multiple subscriber units which are mobile;
  b. broadcasting one or more access numbers, by the one or more routing devices, determined from a subscriber traffic prediction;
  c. allowing, by the one or more routing devices, communication channel access to particular subscriber units having individual access numbers that are compatible with the one or more access numbers broadcast by the one or more routing devices; and
  d. denying, by the one or more routing devices, the communication channel access to other subscriber units when a number of subscriber units attempting to utilize the communication channels exceeds a threshold contained within a system operational plan which is derived from the subscriber traffic prediction.

27. In a communication system comprising a system control segment, one or more routing devices which provide at least one communication channel, where at least one of the one or more routing devices moves with respect to a surface of a celestial body, and multiple subscriber units which are mobile, and which communicate with each other through the one or more routing devices, a method for operating the communication system comprising:
  a. deriving, by the system control segment, traffic models from a collection of call data records describing particular calls between the multiple subscriber units;
  b. determining, by the system control segment, a subscriber traffic prediction based on a set of the traffic models, wherein the subscriber traffic prediction predicts subscriber traffic for a future time set;
  c. generating, by the system control segment, a system operational plan for the future time set from the subscriber traffic prediction;
  d. distributing, by the system control segment, portions of the system operational plan to the one or more routing devices; and
  e. executing the system operational plan, by the one or more routing devices, by conforming operations to the portions of the system operational plan during the future time set.

28. A cellular communication system comprising:

a system control segment, which creates a subscriber traffic prediction based on call data records, and which also creates a system operational plan based on the subscriber traffic prediction, and which also creates individual plans based on the system operational plan;

one or more satellites, which receive the individual plans from the system control segment, and conform operations to the individual plans, and broadcast access information contained within the individual plans; and multiple subscriber units, which contain resident memory devices having access numbers which allow a particular subscriber unit to determine whether the particular subscriber unit may access the cellular communication system based on the access information broadcast by the one or more satellites.

29. A satellite communication subsystem for use in a cellular communication system comprising multiple satellites, at least some of which are moving with respect to a surface of a celestial body, each of the multiple satellites containing communication resources including one or more transmitters and receivers for providing communication with at least one subscriber unit, and having at least two devices for receiving and transmitting electromagnetic energy coupled to the one or more transmitters and receivers, said subsystem comprising:

satellite resident memory containing an individual operational plan provided to the multiple satellites by a system control segment, the individual operational plan for operating the multiple satellites for a future time set, the individual operational plan being based on a subscriber traffic prediction for the future time set and correlated to geographical regions over which the multiple satellites orbit, the individual operational plan causing the multiple satellites to change a satellite's mode of operation at predetermined times during the future time set; and a satellite resident controller coupled to the satellite resident memory and the one or more transmitters and receivers, the satellite resident controller for actuating the one or more transmitters and receivers in accordance with communication traffic passing through the multiple satellites in a manner determined by the individual operational plan stored in the satellite resident memory.

30. A circuit for use by a subscriber unit in a communication system comprising a system control segment and one or more routing devices which provide communication channels, said circuit interfacing said subscriber unit with the communication system and comprising:

means for transmitting identification information to the system control segment where the identification information is used to generate a system operational plan which includes one or more allowable access numbers; and means for attempting to utilize one of the communication channels when the one or more routing devices broadcast the one or more allowable access numbers and one of the allowable access numbers is compatible with a particular access number contained within a resident memory device of the particular subscriber unit.

* * * * *